(12) United States Patent
Derrick et al.

(10) Patent No.: US 9,491,289 B2
(45) Date of Patent: Nov. 8, 2016

(54) REMOTE TRACKING DEVICE AND A SYSTEM AND METHOD FOR TWO-WAY VOICE COMMUNICATION BETWEEN THE DEVICE AND A MONITORING CENTER

(71) Applicant: SECUREALERT, INC., Sandy, UT (US)

(72) Inventors: David Derrick, Sandy, UT (US); Bruce G. Derrick, South Jordan, UT (US)

(73) Assignee: SecureAlert, Inc., Salt Lake City, UT (US)

( * ) Notice: Subject to any disclaimer, the term of this patent is extended or adjusted under 35 U.S.C. 154(b) by 326 days.

(21) Appl. No.: 14/323,831

(22) Filed: Jul. 3, 2014

(65) Prior Publication Data

US 2014/0323104 A1  Oct. 30, 2014

Related U.S. Application Data

(63) Continuation of application No. 11/486,989, filed on Jul. 14, 2006, now Pat. No. 8,797,210.

(51) Int. Cl.
*G01S 19/31* (2010.01)
*H04M 3/42* (2006.01)
*G07C 1/20* (2006.01)
(Continued)

(52) U.S. Cl.
CPC ............ *H04M 3/42357* (2013.01); *G07C 1/20* (2013.01); *G08B 21/0211* (2013.01); *G08B 21/0219* (2013.01); *G08B 21/0269* (2013.01); *G08B 21/0283* (2013.01); *G08B 21/0286* (2013.01); *G08B 21/0288* (2013.01); *G08B 21/22* (2013.01); *H04W 4/02* (2013.01); *H04W 4/021* (2013.01); *H04W 4/16* (2013.01); *H04W 4/06* (2013.01); *H04W 4/22* (2013.01); *H04W 76/007* (2013.01)

(58) Field of Classification Search
CPC ........ G01S 19/31; G01S 19/32; G01S 19/33; G01S 19/34; G01S 19/35; G01S 19/36; G01S 19/37; G01S 5/10; H04M 3/42357; G07C 1/20; G08B 21/0211; G08B 21/0219; G08B 21/0269; G08B 21/0283; G08B 21/0286; G08B 21/0288; G08B 21/22
USPC .................................................... 342/357.07
See application file for complete search history.

(56) References Cited

U.S. PATENT DOCUMENTS

| | | | | |
|---|---|---|---|---|
| 6,362,778 | B2 * | 3/2002 | Neher | 342/357.75 |
| 2007/0023496 | A1 * | 2/2007 | Hall | G08B 21/22 |
| | | | | 235/375 |
| 2014/0159905 | A1 * | 6/2014 | Thompson | H04W 4/021 |
| | | | | 340/573.4 |

Primary Examiner — Harry Liu
(74) Attorney, Agent, or Firm — Workman Nydegger

(57) ABSTRACT

A remote tracking system is described including one or more remote tracking devices and a monitoring center. The remote tracking device includes a tamper-resistant housing intended to be held securely to a wearer by a strap, a positioning system receiver in the housing and operable to receive signals indicative of the location of the remote tracking device, a cellular transceiver in the housing and operable to communicate with the monitoring center, and a processor in the housing and in electrical communication with the positioning system receiver and the cellular transceiver, the processor operable to monitor a status for the remote tracking device. The remote tracking system is able to compare the location of the remote tracking device with a set of pre-programmed rules and establish a two-way voice communication between the wearer and the monitoring center upon the occurrence of certain programmable conditions in the remote tracking system.

26 Claims, 20 Drawing Sheets

(51) Int. Cl.
  *G08B 21/02*  (2006.01)
  *G08B 21/22*  (2006.01)
  *H04W 4/02*  (2009.01)
  *H04W 4/16*  (2009.01)
  *H04W 4/06*  (2009.01)
  *H04W 4/22*  (2009.01)
  *H04W 76/00* (2009.01)

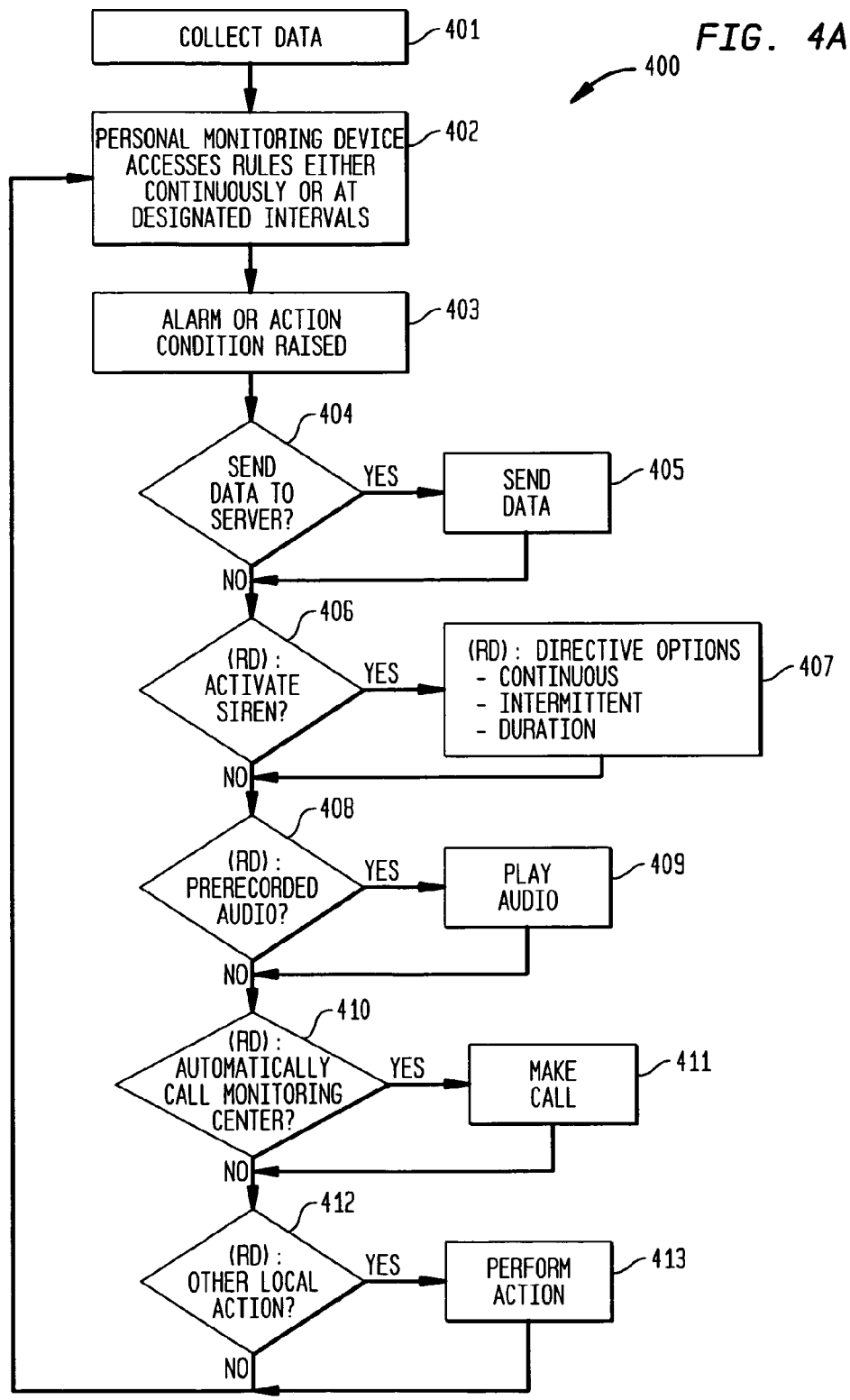

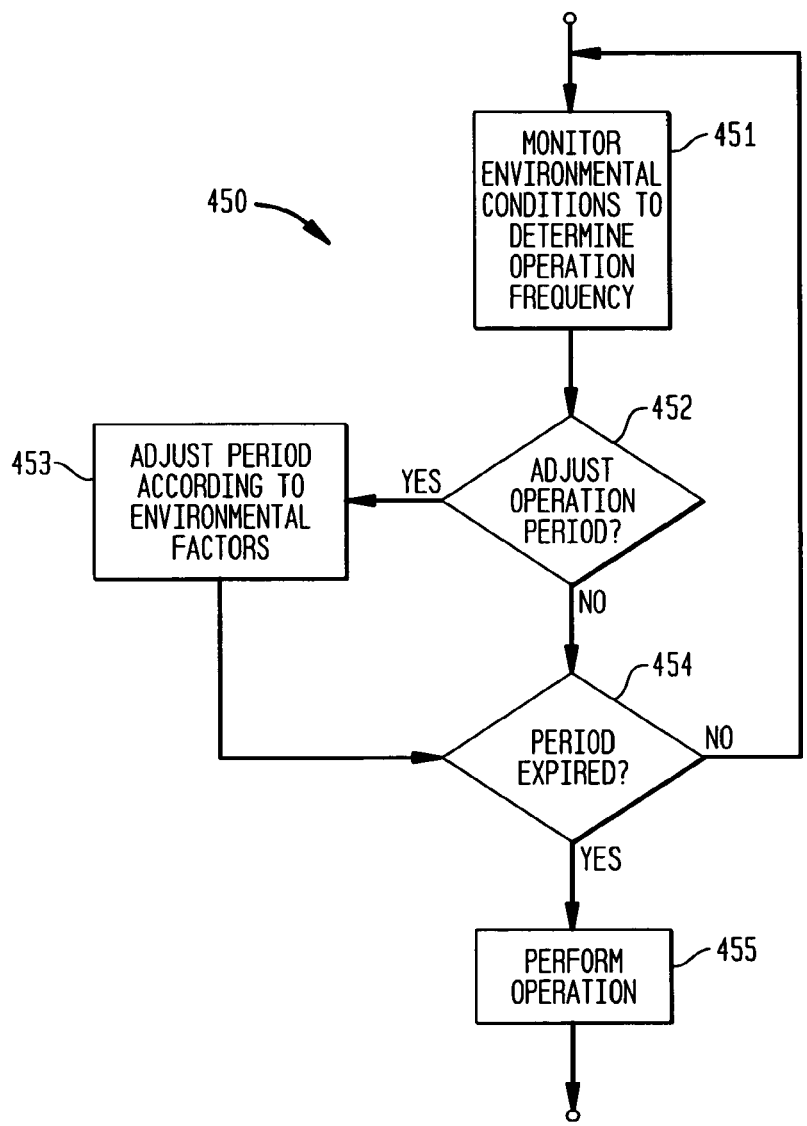

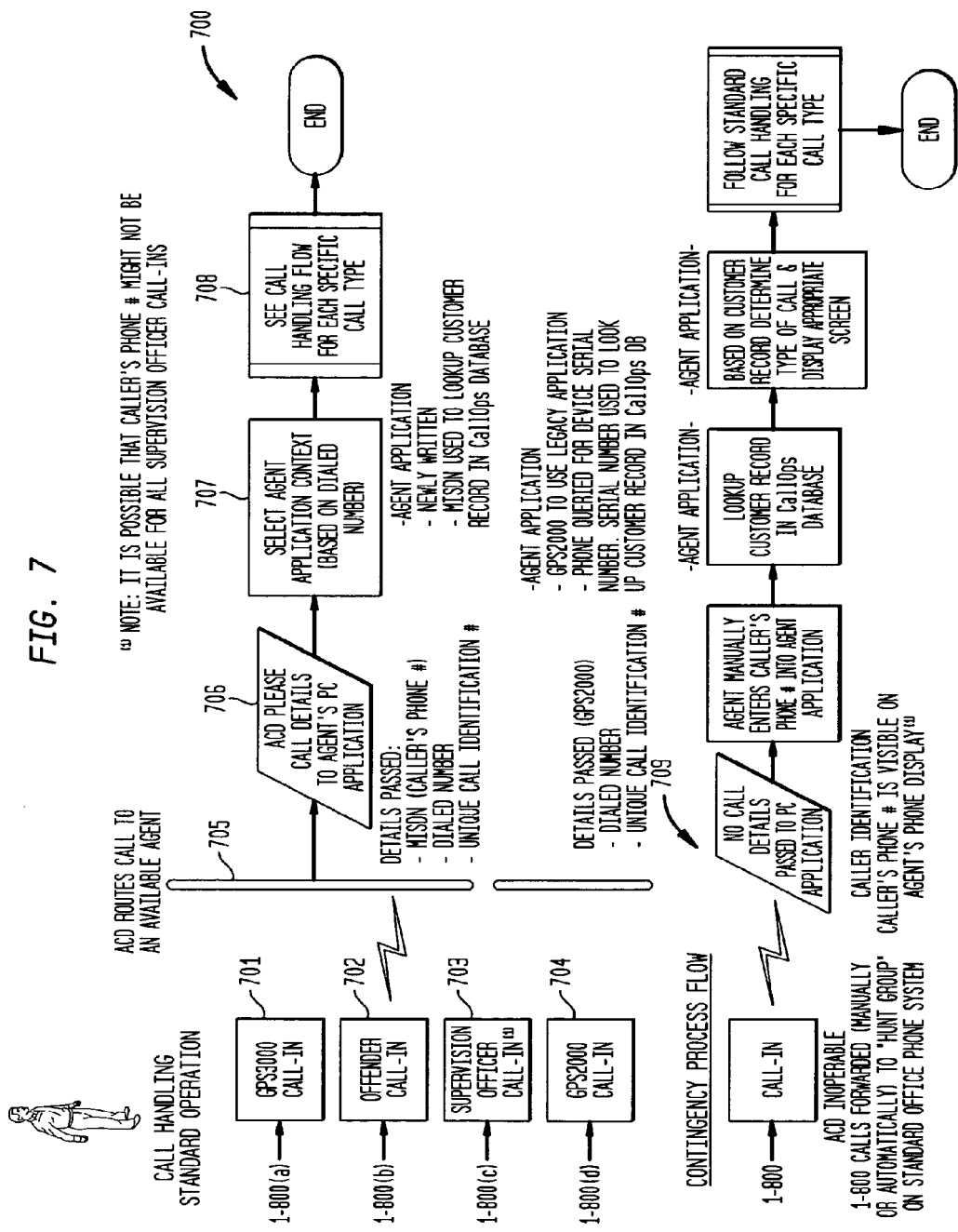

FIG. 8

DEVICE LIST  LOGS  HISTORY  REFRESH  LOGOUT  GATEWAY ADMIN
                          STATUS  SETTINGS  CONTROL  MAP  GEOZONES  CONFIG  GRAPHS

DEVICE STATUS

DEVICE NAME: ◊ OTD 0124 - PP2b.3    UNIQUE ID: ◊ 010652000009304    DEVICE ID ◊ 83

DEVICE AND ALARM STATES

| ALARM OR STATE NAME | STATE |
|---|---|
| EXCLUSION ZONE ALARM | ○ |
| INCLUSION ZONE ALARM | ○ |
| ZONE VIOLATION ALARM | ○ |
| CALL IN PROGRESS | ○ |
| CUFF CONTINUITY DISCONNECT ALARM | ○ |
| CUFF OPTICAL DISCONNECT ALARM | ○ |
| ACCESS PANEL OPENED ALARM | ○ |
| SIM CARD REMOVED ALARM | ○ |
| EXTERNAL BATTERY REMOVED ALARM | ○ |
| CONFIGURATION DIRTY | ○ |
| GPS ERROR | ○ |
| USING INTERNAL BATTERY | ○ |
| CHARGING INTERNAL BATTERY | ○ |
| SIREN ENABLED | ○ |

* A RED INDICATOR MEANS THAT THE STATE IS ACTIVE

BATTERY AND SIGNAL LEVELS

| EXTERNAL BATTERY: ◊ | 3.42 VOLTS |
| INTERNAL BATTERY: ◊ | 3.54 VOLTS LOW |
| CELLULAR SIGNAL STRENGTH: ◊ | 32% |

GPS STATUS

| GPS SATELLITES IN USE: ◊ | 2 |
| MIN SATELLITES REQUIRED: ◊ | 03 |
| GPS FIX TYPE: ◊ | NO FIX |
| SPEED: ◊ | 0.0 MPH (0.0 KPH) |
| HEADING: ◊ | 0° |
| HDOP - VDOP - PDOP: ◊ | 0.0/0.0/0.0 |

LAST STATUS REPORTED AT

| DATE: ◊ | MAY 18 2006 |
| TIME: ◊ | 10:15:34 PM MDT |

DEVICE LOCATION

| LOCATION IS: ◊ | INVALID |
| LATITUDE: ◊ | 40.06386° |
| LONGITUDE: ◊ | -75.18339° |

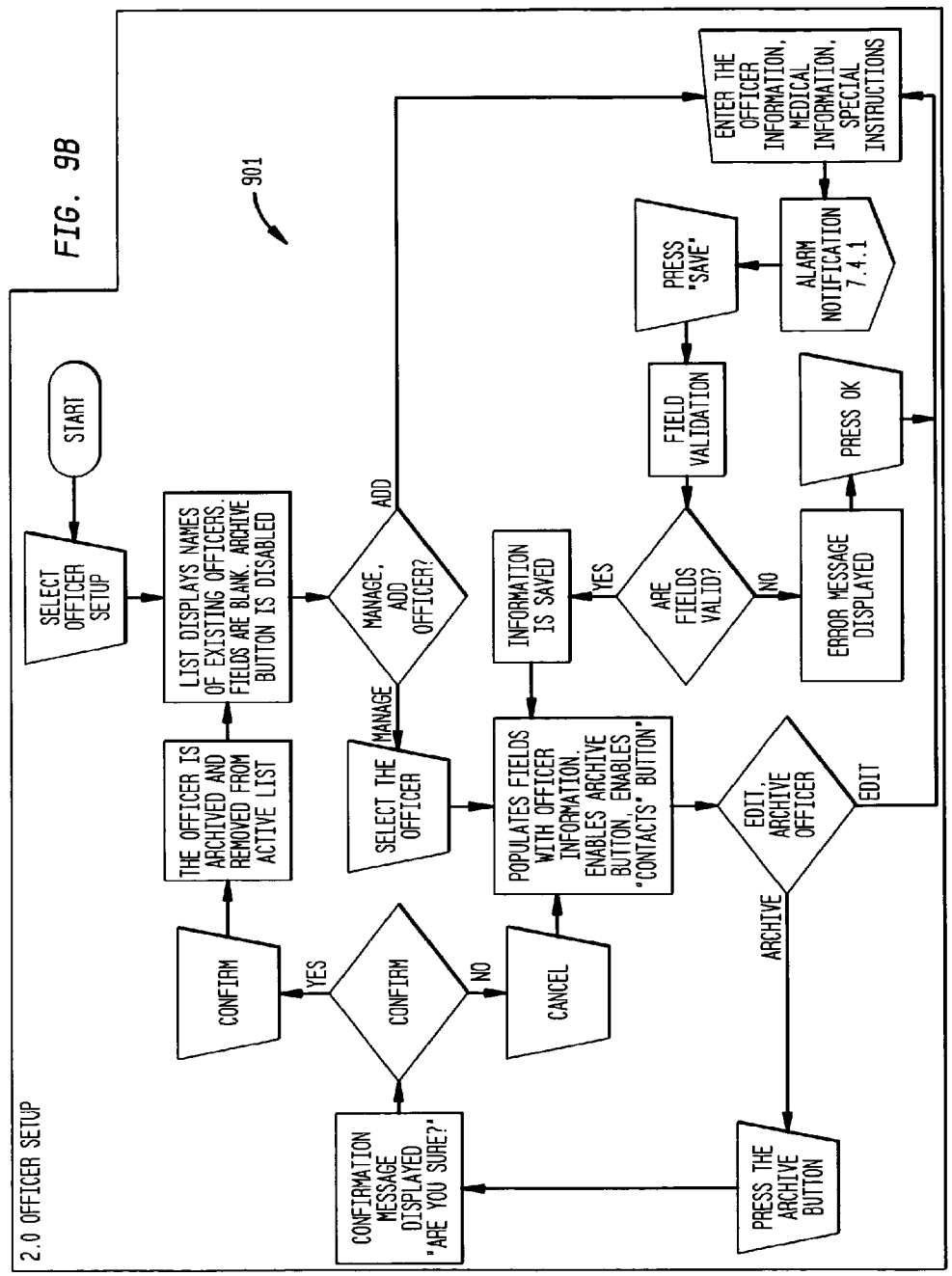

REMOTE TRACKING DEVICE AND A SYSTEM AND METHOD FOR TWO-WAY VOICE COMMUNICATION BETWEEN THE DEVICE AND A MONITORING CENTER

CROSS-REFERENCE TO RELATED APPLICATIONS

This application is a continuation of U.S. patent application Ser. No. 11/486,989 filed on Jul. 14, 2006, entitled "REMOTE TRACKING DEVICE AND A SYSTEM AND METHOD FOR TWO-WAY VOICE COMMUNICATION BETWEEN THE DEVICE AND A MONITORING CENTER," which issued as U.S. Pat. No. 8,797,210 on Aug. 5, 2014, and which application is expressly incorporated herein by reference in its entirety.

BACKGROUND OF THE INVENTION

1. Technical Field

The field of the present invention relates to remote tracking and communication systems and devices, and more particularly to remote tracking devices and systems which incorporate two-way voice communication between a remote tracking device and a monitoring center.

2. Background of the Invention

The Global Positioning System (GPS) is very well known as a mechanism for providing relatively accurate positioning information using small portable devices. To create a remote tracking device useful for tracking or monitoring persons GPS devices need a mechanism to transmit the location information from the GPS to a central site where a record of the person's location can be maintained. There have been several devices that have used terrestrial wireless or cellular networks coupled to a GPS engine to transmit the location data to a central repository. The GPS/cellular device can either transmit the raw GPS data over the cellular network to a central system which can then process the GPS data to determine the location of the device, or if enough processing power is built into the remote tracking device the GPS calculations can be done on the remote tracking device and the derived location information can be transmitted to the central repository. A time stamp can be associated with the location information to provide temporal context for the location information.

An example of such a device is described in U.S. Pat. No. 6,014,080 to Layson, Jr. The remote tracking device of Layson, Jr. includes a tamper resistant strap and housing which holds a GPS engine and a wireless data modem. The remote tracking device communicates with a central station computer using the wireless data modem and transmits the location data for the remote tracking device. The central station includes a computer which is operable to take the position information from the remote tracking device and to compare that location information against a schedule of rules and location restraints to determine if the remote tracking device has strayed from a permitted inclusion zone or has entered a forbidden exclusion zone.

Another remote tracking device is described in U.S. Pat. No. 6,072,396 to Gaukel. The remote tracking device of Gaukel is a two-piece device with a tamper resistant unit securely attached to the person to be monitored. The secure unit is connected to, or in communication with, a body-worn device that includes a GPS engine and a cellular modem. As with Layson, Jr., the cellular modem is used to communicate the location information from the GPS engine to a control station.

Yet another remote tracking device and system is described by U.S. Pat. No. 5,867,103 to Taylor, Jr. The remote tracking device of Taylor, Jr. includes a tamper detection mechanism, a mechanism for receiving a signal from a positioning device, such as a GPS satellite, and a transmitter for transmitting a signal to a central station. The system for monitoring the remote devices includes a position determining mechanism for computationally determining the location of the remote device based on the signal from the positioning device and a temporal marking mechanism for providing a time stamp associated with the location determination.

While each of these devices shares a similar use of GPS and cellular or wireless data technology to gather information about the position of the remote device and to transmit information about the position to a central computer, each of these devices also suffer from the same deficiencies. Examples of these deficiencies are the lack of an ability to do anything with the information once it is received at the central computer. At most the central computers of these devices can generate messages of rules violations that can be transmitted to a parole officer or other recipient. The systems do not provide for any context for the message about the violation and do not provide for computer access to information about the remote tracking device and any violations or a monitoring center which can be contacted by the remote tracking device and the parole officer or other supervisor who has responsibility for the person being monitored.

These systems pass all location data obtained from the tracking devices directly through to the parole officer or supervisor has responsibility for the person being monitored. This places the task of sorting through the mountain of location data directly on the parole officer or supervisor who may be in charge of a great number of persons being monitored. Placing such a heavy burden on the parole office or supervisor is generally undesirable and a waste of resources.

Further, these systems do not allow for voice communication with the person wearing the remote monitoring device. Some of the devices described above can initiate tones or vibrations in the device in the event of a rules violation, but none have the ability to initiate voice communication between the person being monitored and personnel at a monitoring center or the persons parole officer or supervisor.

Still further, these devices to not have any type of alarm system, alarm management, or alarm hierarchy which can be used to warn the person being monitored, or, as a last resort, warn those in the vicinity of the person being monitored that a violation is occurring.

BRIEF SUMMARY OF THE INVENTION

In one embodiment a remote tracking device is described as part of a remote tracking system having a monitoring center. The remote tracking device includes a tamper-resistant housing intended to be held securely to a wearer by a strap, a positioning system transceiver, or receiver, in the housing and operable to receive signals indicative of the location of the remote tracking device, a cellular transceiver in the housing and operable to communicate with the monitoring center, and a processor in the housing and in electrical communication with the positioning system transceiver and the cellular transceiver, the processor operable to monitor a status for the remote tracking device. The remote tracking system is able to compare the location of the remote tracking device with a set of pre-programmed rules, and a two-way voice communication can be established between the wearer and the monitoring center upon the occurrence of certain programmable conditions in the remote tracking system.

In another embodiment a remote monitoring system is described. The remote monitoring system includes one or more remote tracking devices worn by one or more wearers, each remote tracking device including a location determining mechanism, a wireless communication mechanism and a processor operable to monitor the status of the remote tracking device and to compare the location of the remote tracking device to a set of programmed rules, and a monitoring center receiving data from the one or more remote tracking devices, the data including the status information and location information for each device. A two-way voice communication can be established between any of the one or more remote tracking devices and the monitoring center using the wireless communication mechanism.

In yet another embodiment, a method for monitoring a remote tracking device using a monitoring center in a remote tracking system is described. The remote tracking device is worn by a wearer and includes a location determining mechanism, a wireless communication mechanism and a processor. The method includes monitoring the status of the remote tracking device using the processor, generating location information using the location determining mechanism, transmitting the status information and location information to the monitoring center using the wireless communication mechanism, and establishing a two-way voice communication between the remote tracking device and the monitoring center based on the status information and/or location information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 4A-C are flow charts illustrating embodiments of a data processing methods and data reporting methods using the remote tracking system;

FIG. 7 is a flow chart illustrating an embodiment of a monitoring center call flow according to the concepts described herein;

FIG. 8 is a illustration of a screen shot showing an embodiment of a status monitor for a remote tracking device according to the concepts described herein; and FIGS. 9A-9J are flow charts illustrating embodiments of monitoring center application flows for the setup, assignment and modification of various aspects associated with a remote tracking system according to the concepts described herein.

DETAILED DESCRIPTION OF THE INVENTION

Preferred embodiments of a remote tracking device and monitoring system according to the concepts described herein provides for a remote tracking that includes two-way voice communication between the person being monitored and monitoring center personnel or the persons parole officer, supervisor, or other administrator. It also provides for an alarm system for the remote tracking device and associated alarm management system and alarm hierarchy which is capable of warning the offender and potentially those around the offender of a violation of the terms and conditions surrounding the monitoring. Still further, it provides for a comprehensive monitoring system that includes a staffed monitoring center and access by the parole officer, supervisor or administrator to information and tools to manage the information related to the person being monitored and the status of the person and remote tracking device.

Figure 1:
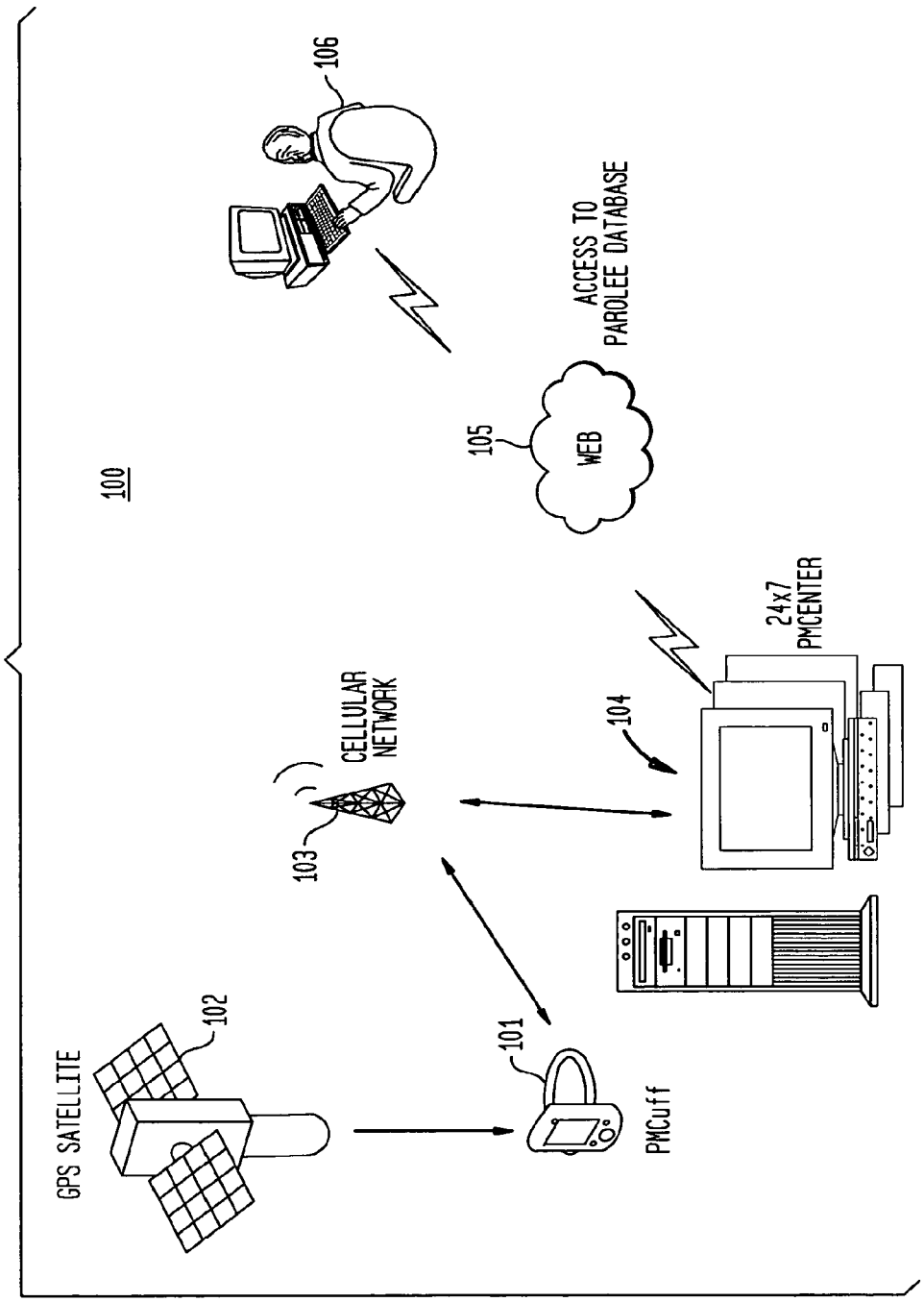
FIG. 1 is a diagram illustrating the major elements of a remote tracking system according to the concepts described herein.

Referring now to FIG. 1, a simplified diagram showing the major elements of a preferred embodiment of a remote tracking system according to the concepts described herein is shown. System 100 is used to track multiple remote tracing devices (RTDs). Each RTD 101 includes a positioning system engine, such as a global positioning system (GPS) engine, which is able to receive signals from one or more sources, either terrestrial networks or satellite network such as multiple GPS satellites 102, and to perform a location calculation based on the signals from the sources. While preferred embodiments described herein will use references to GPS, any position system engine or transceiver, terrestrial, airborne or satellite based, may be used in place of GPS according to the scope of the concepts described herein, including the Galeleo satellite tracking system. Applicant intends the use of GPS herein to be generic to any positioning system and to include all positioning systems. Location determination using terrestrial networks, satellite, or assisted satellite (using satellite signals in association with terrestrial signals such as cellular signals to provide a more precise location determination), is well known and will not be discussed further herein.

In addition to a GPS engine, the RTD includes a wireless/cellular transceiver. After a location determination has been made by the GPS engine or an internal microprocessor, the location information and information indicating the status of the RTD is sent over a terrestrial network, which is preferably a cellular network, as shown by cellular network 103. In order to be useful, each position location for the RTD needs to include an indication of the time for the location. In a preferred embodiment, the RTD uses the time information contained in the GPS signals themselves to provide the time indication for the position determination, however, instead of using the time information from the GPS signal, the RTD itself may provide the time indication from an internal clock. An internal clock may also be used to provide time indications on when data packets were created and sent using the cellular connection.

The information sent by the RTD over its cellular connection is received by monitoring center 104. Monitoring center 104 is preferably a staffed monitoring center providing representatives who can act as an intermediary between the person being monitored and the parole officer, supervisor or administrator with responsibility for the person being monitored. The monitoring center also includes the computer resources required to process, store and analyze the data received from the RTDs and provide the interface for the officers/supervisors/administrators to review the information in the system and to setup, modify and terminate the operating parameters for each individual RTD.

Access to the information in the monitoring center is available through a web interface which connects to a network 105, such as the Internet, which allows persons with authorization 106 outside the monitoring center to access information in the monitoring centers computers. Additionally, cellular network 103 can also be used to establish two-way voice communication between the RTDs and the monitoring center, or responsible officer/supervisor/administrator. While reference is made to two-way voice communication, the term two-way is meant to encompass any interactive voice communication involving two or more parties, including three or more-way voice communication and would include conference type calls and multiparty calls. The two-way voice communications may use the same infrastructure as the data connections between the RTD and monitoring center, or may use completely different infrastructure or paths through the network than the data connections. Other third parties may also be in the voice or data path between the RTD and monitoring center to provide any number of functions, including the recording and archival of the voice communications between the RTD and monitoring center, and still be within the scope of the concepts described herein.

Figure 2:
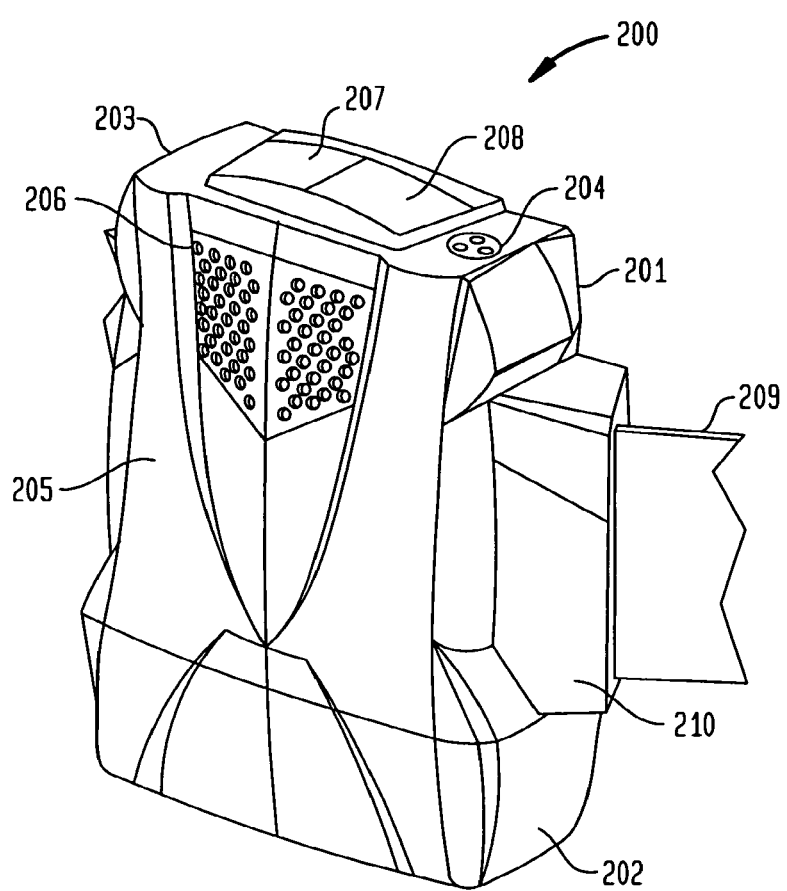
FIG. 2 is a perspective view of a remote tracking and communication device according to the concepts described herein.

Referring now to FIG. 2, an embodiment of the physical characteristics a remote tracking device 200 according to the concepts described herein is shown in greater detail. Device 200 includes housing 201 with battery 202 removably affixed thereto. The single housing is configured to contain all electrical components necessary for tracking and communicating with the individual wearing device 200. Battery 202 provides power to the electronic circuitry within housing 201, as described below, and is preferably rechargeable. Top side 203 of housing 201 includes a first set of through ports 204. Another side 205 of housing 201 includes a second set of through ports 206. The first set of through ports 204 are configured to allow sound to pass through to a microphone (not shown) disposed within housing 201, while the second set of through ports 206 are configured to allow sound to pass outward from a speaker (not shown) which is also disposed within the housing 201. Top side 203 of housing 201 also includes two panels 207 and 208, at least one of which is configured as a rocker button to activate one or more of the electronic components described below.

The rear face of device 200 includes an appropriate curvature so that it can be attached to a person's body, preferably to an ankle. Battery 202, which is inserted into the bottom side of device 200, includes a release lever (not shown) which is movable to release the battery from the housing. Each end of a strap 209 (partially shown) is secured within an extension on each side of housing 201, such as extension 210. Strap 209 and the strap connections to housing 201 are tamper resistant and include security measures intended to prevent the disconnection or severing of strap 209, or if strap 209 is severed, device 200 can provide a signal indicating the status of the strap. The strap preferably includes one or more optical fibers and/or conductive materials embedded throughout its length, each of which is exposed at either end of the strap and connected to the electronics in device 200 which can determine the integrity of the connections.

Additional tamper detection may be achieved through monitoring all externally accessible fasteners, e.g., the screws affixing the pressure block to the housing, the external battery, and the like, for electrical continuity by using each fastener to complete, or as part of, an electrical circuit.

Figure 3:
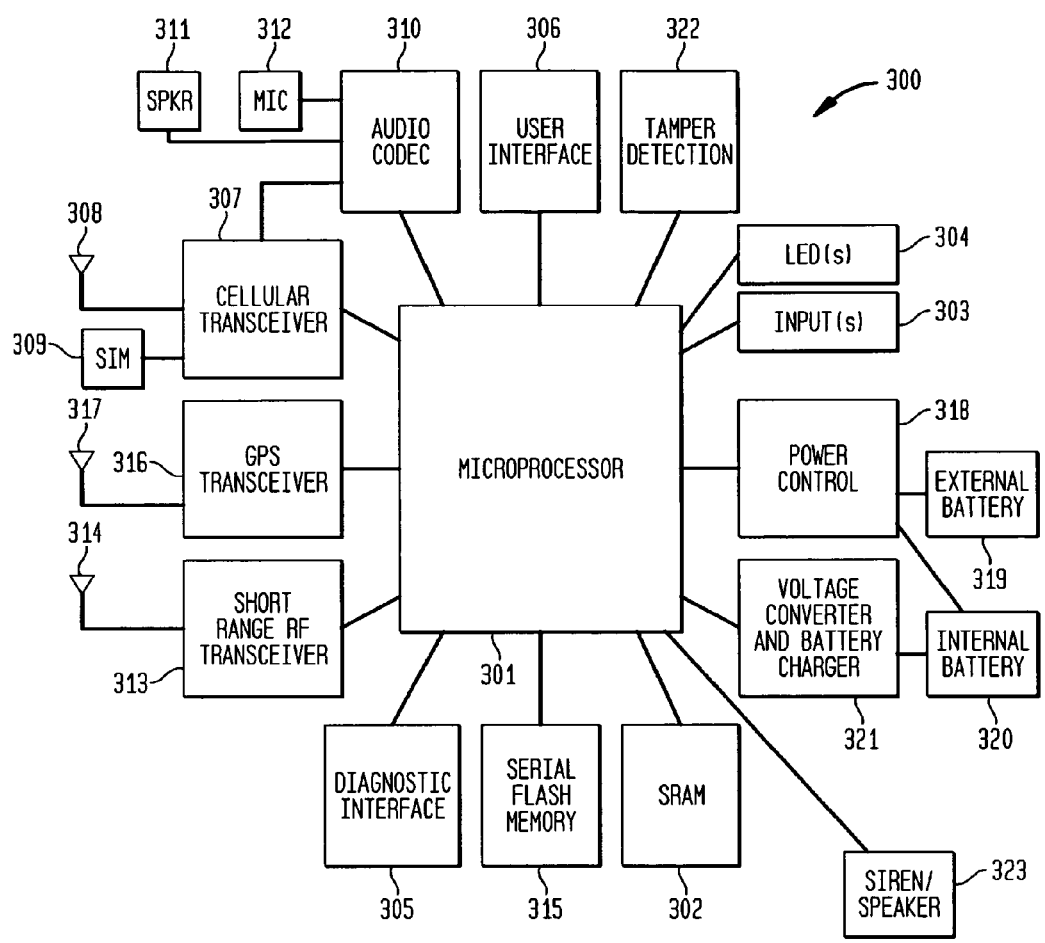
FIG. 3 is a schematic view of the electrical components in a remote tracking and communication device.

Referring now to FIG. 3, an embodiment of the electronic aspects of the remote tracking device is shown. The type of connection between the various components is a matter of design choice, and may vary depending upon the specific component chosen to perform for a particular function. Further, where a specific component is indicated, those skilled in the art will appreciate that the indicated component may be substituted with other, functionally equivalent components that are readily available in the marketplace.

Electronics 300 includes microprocessor 301. Microprocessor 301 controls overall operation of the device according to programming stored in memory 302, which can be SRAM memory. Electronics 300 may include inputs 303, which can be inputs such as switches or buttons, are included as inputs to microprocessor 301 and can be used to input data or provide for activation of pre-designated functionality controlled by microprocessor 301. In embodiments of the RTD, there is one button dedicated for activation of voice communications with the monitoring center. LEDs 304 are used as function and status indicators. The programming stored in memory 302 may be placed there at the time of manufacture, and additional, new or modified programming may be uploaded to the device using a wired connection via the included diagnostic interface 305, user interface 306, or wirelessly via the cellular transceiver 307 received by antenna 308.

Cellular transceiver 307 may be of the GSM/GPRS variety, and may include a SIM card 309. Cellular transceiver 307 allows two-way voice and data communication between the remote device and the monitoring center 104 from FIG. 1. Voice communications are further enabled by a direct connection between cellular transceiver 307 and an audio codec 310, which encodes and decodes the digital audio signal portion of the wireless transmission, and an associated speaker 311 and microphone 312. Data communications preferably use the cellular data channel and/or the cellular control channel, which can make use of short message service (SMS) capabilities in the network. This has additional benefits in that it provides redundancy for cellular systems in which service for both types of data communication is supported. Also, for those cellular systems in which the voice channel cannot be used simultaneously with the data channel, or in which the data channel is simply unavailable, the control channel can provide a data link between the call center and the device.

Electronics 200 may also include short range wireless transceiver 313 and associated antenna 314, which, if included, allow for short range wireless voice and data communications with peripheral devices. This second wireless transceiver 114 can be chosen to utilize the wireless communications standard published by the ZigBee Alliance, information about which may be found at www.zigbee.org. Wireless transceiver 313, however, may be designed and implemented using any of the alternative wireless communication standards which are well known in the art. Microprocessor 301 can be programmed to pass through voice communications received by cellular transceiver 307 to a voice-capable peripheral when such a peripheral is employed in conjunction with the remote tracking and communication device and is activated. Voice communications received from a voice enabled peripheral can be passed through to cellular transceiver 307 for transmission. Data generated by the device or received from a peripheral, if any, may be stored by microprocessor 301 in memory 315, which can be non-volatile memory such as serial flash memory until required by microprocessor 301 or until it is to be transmitted by the device.

GPS receiver 316 and antenna 317 receive signals transmitted by GPS satellites, the signal used to establish the geographical location of the device and the person being monitored. In one embodiment, data from GPS receiver 316 is passed through to microprocessor 301, which in turn processes the data to determine a location and associated time, and stores it in the serial flash memory 315 pending transmission using cellular transceiver 307. While electronics 300 are shown with a GPS receiver which passes the GPS signal data to the microprocessor for processing, a GPS engine which includes both the GPS receiver and the capability to process the GPS signal to produce a location determination and associated time indication may also be used according to the concepts described herein. Using a stand alone GPS engine would free processing bandwidth in the microprocessor, thereby allowing the microprocessor to perform other additional functions.

Cellular transceiver 307 may also be used to geographically locate the device through well known methods of cell tower triangulation, or may be used to provide location information used in assisted GPS schemes. Geographical location using cellular transceiver 307 may be performed in addition to, in conjunction with, or as a substitute for the GPS receiver 316. Other known methods for geographically locating the device may also be employed.

Either of memories 302 and 315, or memory resident on the microprocessor, may be used individually, or may be used in any combination to store the operating program and parameters for the operation of the device, as will be discussed later, and may further be used to store prerecorded messages which can be played through speaker 311 as part of the monitoring and alarm management system which will be discussed in greater detail below. A siren/speaker 323 may also be included in the device and controlled by microprocessor 301. Siren 323 is also used as part of the alarm system and can be activated to provide a high decibel audible alarm. This alarm can both warn those in the vicinity that the person being monitored has entered an exclusion zone or left an inclusion zone, and can aid the police in the location of the person being monitored. The siren can be activated automatically by the microprocessor as part of the alarm management system or can be activated remotely by sending a signal to the microprocessor using cellular transceiver 307. Siren 323 can be a separate device or could be combined with the functionality of speaker 311. Tamper detection circuit 322 monitors the condition of strap 209 from FIG. 2 and any other tamper detection sensors that may be part of housing 201.

In the embodiment shown in FIG. 3, power to the processor and other electronic components is provided though power controller 318 by external battery 319, or internal battery 320 when the external batter is disconnected or the voltage of the external battery falls below a threshold. External battery 319 is removable and is preferably rechargeable by a separate recharging unit. Also, the person being monitored will preferably have multiple external batteries so that a charged external battery can be immediately inserted when a discharged battery is removed. Internal battery 320 is preferably internal to the housing and not accessible by the person being monitored. The internal battery allows the device to continue to operate normally while the external battery is being replaced. As the internal battery is intended to supply power to the device only during the transitioning from a depleted external battery to a charged external battery, or to provide a short amount of time to acquire a charged battery, the internal battery does not need to have a large capacity. Internal battery 320 is charged using power from external battery 319 using voltage converter 321 and/or a battery charger which may be connected to the device through voltage converter 321.

Since RTD 200 is intended to be worn around the ankle of the person being monitored, the microphone and speaker used for two-way voice communication is a significant distance from the ears and mouth of the person being monitored. To compensate for this a peripheral device may be used in conjunction with the RTD to aid in the two-way voice communication. In one embodiment the peripheral device has the form factor of a watch and includes an internal speaker, an internal microphone, and an internal short range wireless transceiver. The microphone and speaker are positioned in the housing of the peripheral to better enable voice communications. The short range wireless transceiver is configured to use the same wireless communications standard as the RTD to enable wireless voice and data communications between the device and the peripheral. A button can be included which, when pressed, causes a command signal to be sent to the RTD. This command signal can be used to instruct the remote tracking and communication device to initiate two-way voice communications with the monitoring center. When the peripheral device is used for such voice communications, the peripheral device communicates wirelessly with the RTD using the respective short range wireless transceiver of each respective unit, and the RTD then uses the cellular transceiver to connect the voice communications with the monitoring center. The microphone and speaker in the RTD can be disabled by the microprocessor when a peripheral device, such as described, is in use.

Using electronics such as those described above, embodiments of a remote tracking devices according to the concepts described herein may be programmed with a variety of useful features. One such feature is the ability to track the geographical location the individual wearing the device. Most frequently, the GPS receiver is used to determine the location of the device (and thus the wearer) at the time indicated in the GPS signals received from GPS network satellites. When the GPS is unable to determine location, the cellular transceiver may be used to determine the location of the device using well-known cellular tower triangulation techniques. Once identified, the location of the device is passed to the microprocessor, which processes the data according to its programming and stores the data in the memory.

Figure 4B:
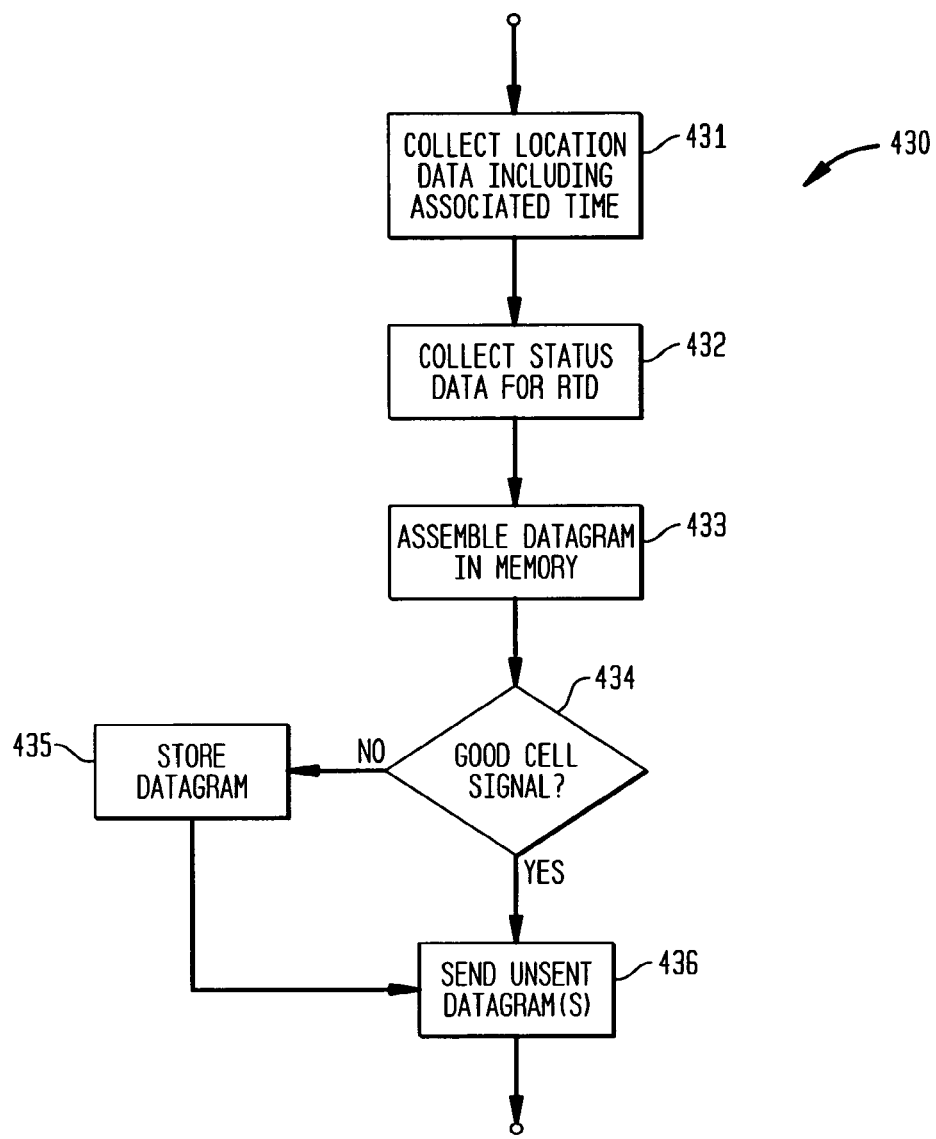

As illustrated in method 430 shown in FIG. 4B, in some embodiments each element of location data, including the time is collected, as shown by process 431, and along with the current status of the RTD, process 432, is placed into a datagram, process 433, and send through the cellular transceiver immediately, process 436, as long as the RTD has a good cellular signal, process 434. If there is not a good cellular signal, the RTD stores the datagram and all subsequent datagrams, process 435 until a good cellular signal is detected by the RTD. When the good cellular signal is established all of the unsent datagrams are then sent to the monitoring center computers over the cellular network, process 436.

In other embodiments, the datagrams may be stored and sent in batches. In batch send embodiments, method 430 would repeat processes 431, 432 and 433 until a predetermined number of data grams were stored, or until a timer expired before continuing on to process 434.

In yet other embodiments, any number of operations, such as (in this example) the batch sending of datagrams, could be determined from environmental factors and not tied to a predetermined or preprogrammed number, such as the number of datagrams or a predetermined timer, as is illustrated in method 450 shown in FIG. 4C. In method 450, the environmental conditions are monitored to determine if the period, or frequency of the operation, should be adjusted. These environmental conditions could be any condition that might require a different reporting frequency, such as the current speed of the RTD, the location of the RTD, conditions/events detected by the RTD, such as physiological conditions/events, sensor inputs to the RTD, notices of conditions or events from the monitoring center, or any other environmental condition, event or factor. Operations could include, but are not limited to, sending of data by the RTD, performing location determinations, issuing alerts to the wearer, generating alarm conditions, or any other operation that may be tied to environmental conditions, events or factors. For movement speed, for example, the RTD can determine, from comparing previous location and time measurements, the rate of movement of the RTD, and by association its wearer. As a result, the RTD may determine that location information needs to be sent more frequently and may further determine that more frequent location determinations need to be made. Similarly, if the RTD is approaching an exclusion zone or the edge of an inclusion zone, the RTD may determine that more frequent location determinations should be made and/or transmitted to that the system is more quickly aware of a violation that would occur at normal rates. Though speed and proximity are used as examples of environmental factors that could be used to determine batch send frequency or even location determination frequency and factor that can be monitored and used in the frequency determination is included in the concepts described herein.

In process 452 of method 450 it is determined if the batch send timer needs to be adjusted. If yes, process 453 adjusts the timer accordingly. Process 454 then determines if the timer has expired, if not, the method returns to process 451. If the timer has expired the method passes to process 455, which sends the accumulated datagrams.

As referenced above, embodiments of the remote tracking devices and/or the remote tracking system can be programmed to track the location of an RTD with respect to inclusion and exclusion zones. In these embodiments the microprocessor can be programmed to compare location data against rules which establish predefined geographical areas where the person being monitored is required to be (inclusion zones), or forbidden from being (exclusion zones). These zones can be tied to specific times of the day, such as curfews. A curfew is defined by a geographical area within which the device (and thus the wearer) needs to be physically located during specified times. Examples of curfew rules include requiring the wearer to be at a home area during the evening and overnight hours or at a work area during work hours. An inclusion zone is a geographical area within which the wearer is required to remain during specified times or a boundary outside of which the wearer is not allowed to travel. Inclusion zones and curfews, under these definitions, can also therefore be layered. For example, there may be a permanent inclusion zone, such as the county of residence of the wearer, outside of which the wearer is not allowed to travel without specific permission. Inside of this permanent zone there may be time specific zones, such as the wearers home during overnight hours or workplace between 8 am and 5 pm.

An exclusion zone is a geographical area outside of which the wearer is required at all times. The rules can be established for any particular device at the time of initialization, modified at any time, or even temporarily suspended, at any time through changes to the parameters entered into the monitoring center computers and downloaded to the device, or entered directly into the device through direct connections to the diagnostic or user interface components of the device. In addition to geo-zone type rules, rules dictating a "report-in" type requirement may also be programmed into the device. These "report-in" rules could be used to satisfy report in requirements for some parolees. The device would be programmed with chronological points at which the wearer could be notified, such as by a prerecorded voice message stored on the device, to contact the monitoring center or other person at that time, or within a specified interval. The wearer could activate the voice communication on the device or could report in by other means. Further, rules for monitoring physiological conditions/events can be programmed into the device. Sensors on the remote tracking device, or peripherals to the remote tracking device, could be used to monitor physiological conditions. If measurements associated with those physiological conditions fall outside an expected range, which could be programmed in the form of a rule, or if a physiological event occurs as detected by a sensor, an alarm condition could be generated by the processor and sent to the monitoring center.

As described, the memory can be utilized to store prerecorded voice messages or other audio which provide feedback during operation of the device. Prerecorded voice messages, are preferred to tones or vibrations because they do not require a reference manual or knowledge of the wearer for interpretation. In addition to alarm type messages, voice message feedback may be advantageously utilized during initial setup of the device in that it provides step-by-step instructions for the setup routine, including directing the administrative user to input information about the device and user into the database via the web application described below. Voice message feedback may be similarly utilized during the detachment process to ensure that the device is removed by an authorized individual. During the removal process, if the audible instructions are not followed, i.e., inputting requested information into the database, then the device is preferably programmed to generate an alarm, which is processed as described below.

Following the initial power-up sequence, the device may be programmed to establish a data connection with a monitoring center computer, or central server, to which the device provides device-specific identification data. This eliminates any need for the administrative user to connect the device to a local computer or terminal for the initialization process. The monitoring center computer(s) is/are programmed to maintain a data base of data sent by tracking and communication devices. Upon initial contact, the central server creates a database entry using the device-specific identification data.

The administrative user is provided access to data on the central server via a computer or terminal. In instances where the device is used as a tracking device for offenders, the administrative user may be the supervision officer or other authority figure. For other service applications, the administrative user and the wearer may be the same individual. Access to the database may be advantageously implemented as a web application, or it may be implemented as a stand alone application.

During normal operation, the GPS receiver identifies the geographical location of the device, and the microprocessor processes and stores that location data according to its programming. The device may be programmed such that geographical location is continuously monitored or monitored at specified intervals. In certain embodiments, with an appropriate peripheral, the device may also be programmed to monitor physiological conditions of the wearer. The microprocessor actively monitors other components of the device for indications of tampering, battery exchanges/replacements, and equipment failure.

Referring now to FIG. 4A, a flow chart is shown illustrating an embodiment of a method 400 by which microprocessor 30 I from FIG. 3 can monitor and processes certain conditions. The microprocessor is preferably programmed to collect and store location data and data related to the status of the device and other monitored conditions in the flash memory, as shown by process 401. The microprocessor is further programmed to perform additional functions based upon application of the rules to the data collected, shown by process 402, upon predetermined intervals, or upon occurrence of a particular condition, such as, e.g., when tampering is detected, when the wearer has entered an exclusion zone, when the external battery need to be replaced, or when the wearer's heartbeat is irregular or no longer detectable, the latter requiring a separate peripheral.

When an alarm condition is raised or action is otherwise required, as shown by process 403, whether because the action is preprogrammed based on the status of the device, or the action is the result of a command received from the monitoring center, the monitoring center server or the administrative user, the microprocessor proceeds through a series of queries to determine the appropriate action. It should be noted that both the condition resulting in an action, and the action taken the microprocessor, are preferably programmable through the monitoring center, the web application or through a direct interface connection to the device. The first query 404 is whether to send data to the monitoring center by immediately initiating a data connection with the central server to transmit data relating to an alarm or data that is stored in memory, as shown in process 405. Next query 406 determines if siren 323 from FIG. 3 is activated, producing an audible alert, as shown by process 407.

The next query 408 determines whether the RTD should play one of the pre-recorded messages stored in memory, as shown by process 409. Query 410 determines whether to call the monitoring center by initiating a two-way voice communication using the cellular transceiver, as shown by process 411. Finally query 412 determines if the RTD should take some other programmed action as shown by process 413. Other actions may include, but are not limited to, storing data related to an alarm in memory for transmission at a later time, storing updated rules data to memory, or suspending rule violations notification for a period of time. While queries 404, 406, 408, 410 and 412 are shown in FIG. 4A in a particular order, the order is arbitrary and may be modified by programming the device.

As an example of method 400, in instances where the location data indicates the device is located outside of a geographical location permitted by the rules, the RTD may provides audio feedback to the wearer indicating the rule violation, in the form of a siren or a prerecorded message, and immediately sends notice to the central server for additional processing. The notice would includes the geographical location of the device, the time of the location, and an indicator of the rule violated. If the wearer did not respond to the prerecorded message, the RTD might then escalate the alarm condition by establishing a two-way call with the monitoring center. The monitoring center personnel would then attempt to direct the wearer to leave the exclusion zone and verify that the wearer was complying with the request. If the wearer still did not comply with the request, the alarm condition could be escalated still further by activating the siren on the RTD and the monitoring center could then contact the local authorities and direct them to the wearer.

FIG. 4A and the above example illustrates an alarm management system in accordance with the concepts described herein. Although the example above recited specific steps, the concepts described herein relate to any alarm management system where the remote tracking device and the remote tracking system step through a series of alarm conditions and upon failure by the wearer to resolve the alarm condition, escalate the alarm to a higher level of response or intervention. Such alarm conditions could include, but are not limited to, battery alarms, rules violation alarms, tampering alarms and any other condition that can be programmed into the device and recognized by the device.

Figure 5:
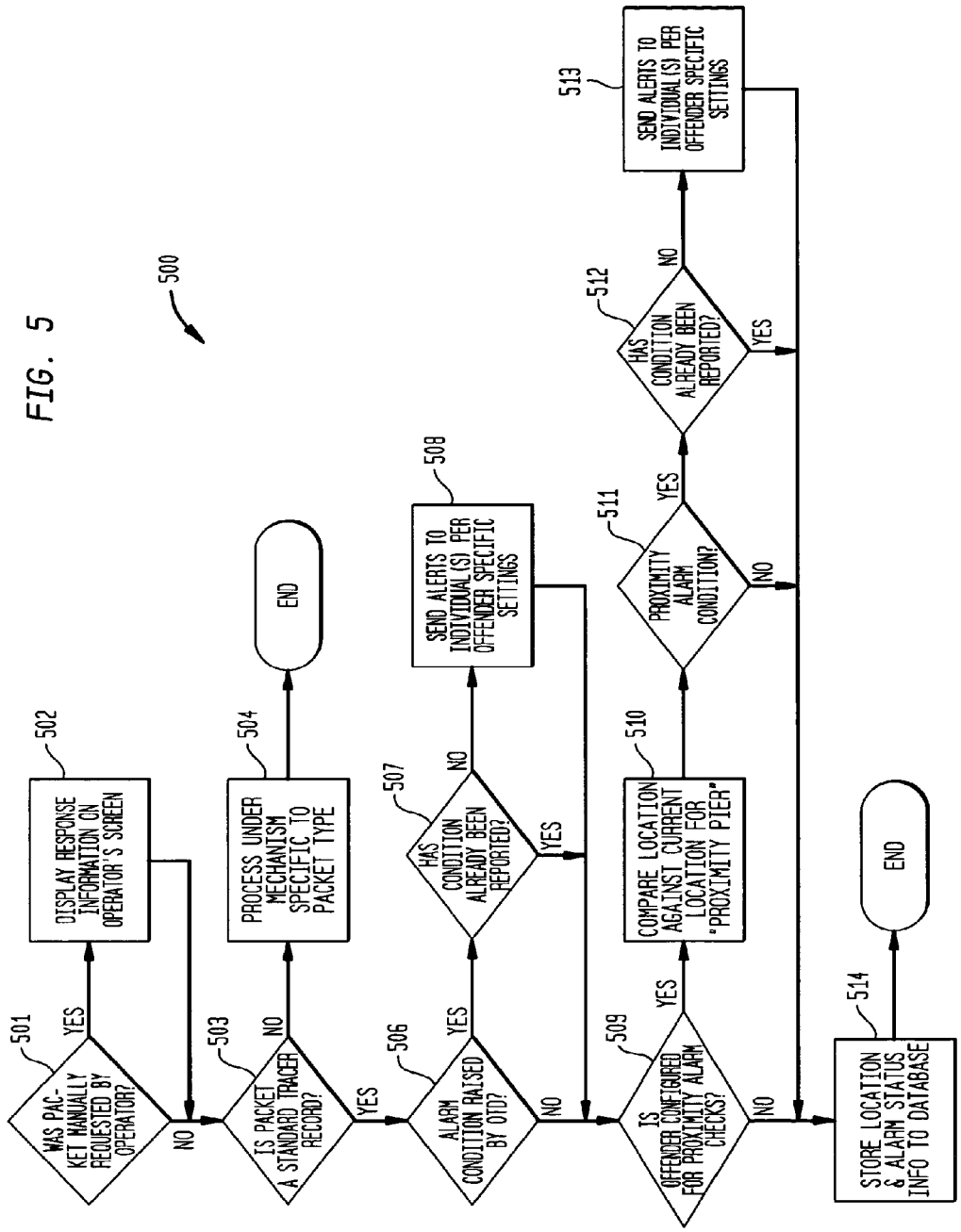
FIG. 5 is a flow chart illustrating an embodiment of a data processing method using the remote tracking system.

Referring now to FIG. 5, an embodiment of a method 500 illustrates processing data from the device when it is received at the central server. Initially, the central server determines if the data includes information that was expressly requested by an operator at the call center or by the administrative user, as shown by process 501, and if so, the data is relayed to the operator or administrative user for display at a computer or terminal, process 502. Next, the central server determines if the data includes a standard tracer record in process 503, which may include self-identification of the device, self-diagnostic reports, upload audit logs, component version identification, confirmation of parameter changes such as volume control, suspending audible alarms at the device, activating or deactivating the speaker, and the like. Standard tracer records are processed as necessary and noted in the database, as shown in process 504.

If the data does not include a tracer record, the central server determines if the data is an indicator of an alarm condition in process 506. If the data is indicative of an alarm condition, the central server determines if the alarm is a repeat of an alarm which was previously received and reported, as shown by process 507. For alarms that were not previously received, the central server takes the appropriate notification action as programmed by the administrative user, as described by process 508.

If the data is not indicative of an alarm condition, the central server determines whether the individual wearing the device is subject to geographical location rules in process 509. In such instances, the central server determines whether a rule has, in fact, been violated, process 510, and determines if an alarm condition exists, process 511. When an alarm condition is raised, the central server first determines if the alarm is a repeat of a previous alarm, as shown in process 512, and if so, takes the appropriate notification action as programmed by the administrative user in process 513.

When immediate administrative user notification is not required, or no alarm condition is raised, the data is stored in the database, as shown by process 514, and reported to the administrative user in periodic reports which at least lists all alarm conditions received since provision of the last report. All recorded data may optionally be included in the report.

In embodiments of the remote tracking system according to the concepts described herein, the notification actions are fully configurable by the administrative user through the web application. The administrative user may designate specific types of alarms for immediate notification, and notification may be arranged through one or more methods including fax, email, text messaging to a pager, text messaging to a cellular phone, or through a direct call from the call center, or the like. In addition, the administrative user may also designate that some specific types of alarms result in direct notification to local authorities for immediate action.

The web application may also provide the administrative user with the ability to temporarily suspend reactions to specific types of alarms. During suspension, the device will suspend localized reactions only (i.e., pre-recorded voice messages, siren, initiating voice communications with the call center). The device will still transmit all alarms identified during suspension to the central server, which will in turn include all identified alarms in the periodic reports (e.g., weekly) to the administrative user. The web application may also provide the administrative user and call center operators with the ability to enter and store notes. Notes may be in the form of personal daily monitoring logs, calendared appointments or action items, case management directives, or contextual notations related to particular alarms saved within the database.

In embodiments of the remote tracking system, the central server may enable the call center or the administrative user, through the web application, to send commands or other data to the device. Such commands may include playing a pre-recorded message to the wearer, instructing the microprocessor to transmit data to provide a current status of the location and status of the device, and the like. The administrative user may also use the web application to instruct to the call center to initiate voice communications with the wearer. The call center then contacts the wearer by placing a cellular call to the cellular transceiver. Once the wearer is contacted, the call center then initiates a call to the administrative user and conferences the two calls.

Preferably, all voice communications with the device are made through the call center so that all calls may be recorded and saved within the database. This enables the call center and the administrative user to access the recorded calls at a later time as needed. To ensure that all calls are recorded, the cellular transceiver may be configured to block all incoming calls that do not originate from the call center. Alternatively, the cellular transceiver may be configured to selectively block incoming calls by utilizing the area code and telephone prefix to identify the origin of the call, allowing calls only from selected area codes and prefixes. Alternatively, the cellular transceiver may selectively block all calls except those from list of phone numbers that is stored in memory.

In embodiments of the remote tracking system, the wearer may also initiate voice communications with the call center. In these embodiments, at least one of the buttons on the exterior of the device housing may be configured to activate voice communications using the cellular transceiver. When pressed, the device is programmed such that cellular transceiver may only contacts the monitoring center. The device preferably has stored in memory a primary number for the call center and a secondary number in case a connection cannot be achieved on the primary number. Further, the device is programmed to attempt make a predetermined number of attempts to contact the call center, first at the primary number, then at the secondary number. Should all attempts fail, the device is preferably programmed to sound an alert" condition to the wearer as an indication that the device is out of a cellular service area or requires service for an internal fault.

As has been referenced above, the monitoring center, or call center, is the focal point of the preferred embodiments of the remote tracking system according to the concepts described herein. The monitoring center is able to communicate with the remote tracking devices, the wearers of the remote tracking devices, and the officers, supervisors or administrators in charge of the persons wearing the RTDs. The monitoring center is also the repository for all the data collected from the RTDs and allows direct access to the data by the monitoring center employees and remote access by the administrators through the web application. The monitoring center also provides the mechanisms for establishing and modifying the operating parameters of the RTDs, including the rules for each wearer.

Figure 6:
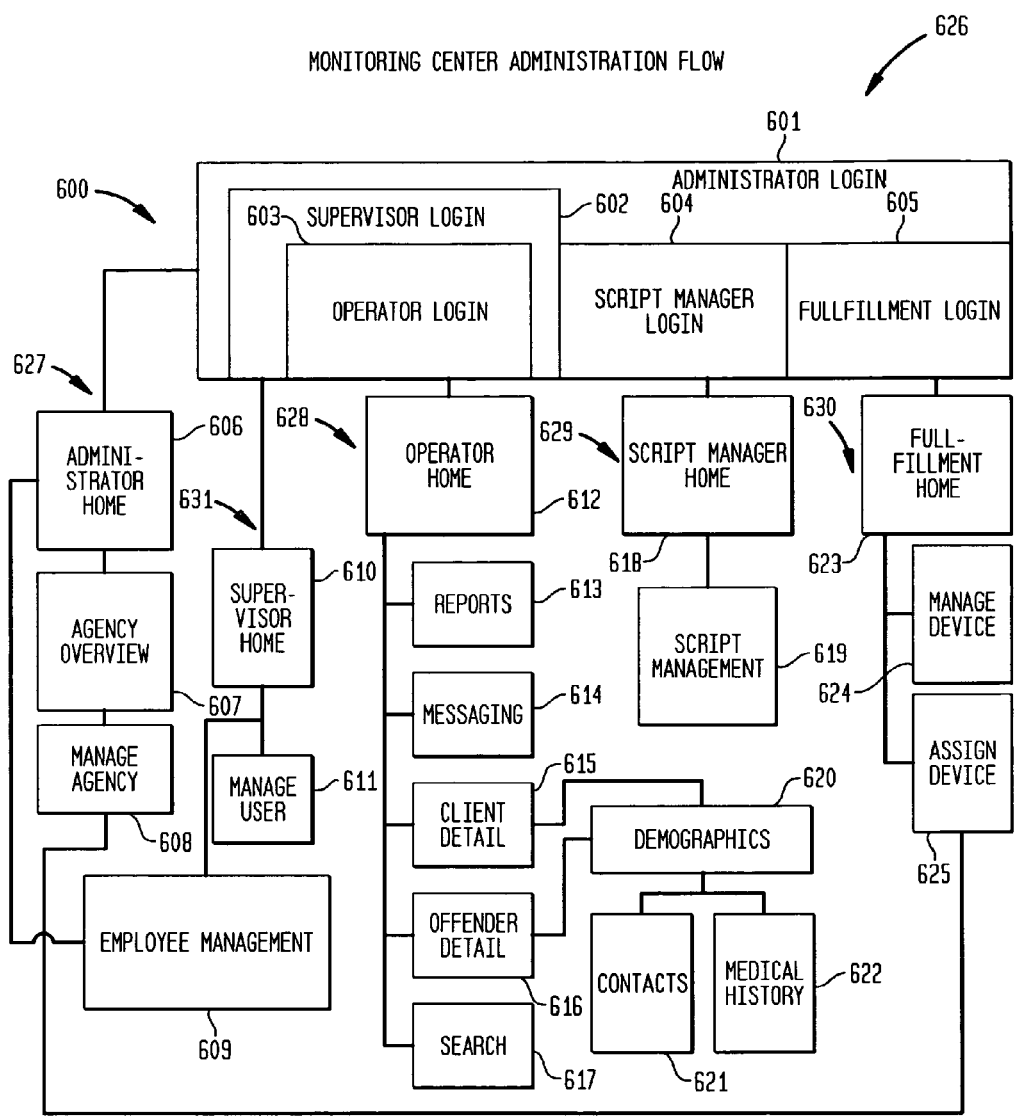
FIG. 6 is a chart illustrating an embodiment of a monitoring center administration flow according to the concepts described herein

Referring now to FIG. 6, an example of an embodiment of a monitoring center administration flow 600 is shown. Flow 600 begins with the login access 626. Administrator login 601 provides a user with administrator privileges access to the entirety of flow 600, including administrator flow 627, operator flow 628, script manager flow 629, fulfillment home 630, and supervisor flow 631. Lesser login privileges, such as supervisor login 602, operator login 603, script manager login 604 and fulfillment login 605 provided only access to their respective flows and any less included flows, such as the supervisor login providing access to supervisor flow 631 and operator flow 628.

Administrator flow, accessible by an authorized administrator, includes access to the administrator home 606 and to agency overview functions 607 and manage agency functions 608, as well as employee management functions 609. Supervisor privileges provides access to supervisor home 610, manage user functions 611, as well as to employee management functions 610. Supervisor privileges also provide access to operator flow 628 as does operator privileges. Operator flow 628 includes access to operator home 612 which includes access to reports functions 613, messaging functions 614, client and offender detail 615 and 616, respectively, and to search function 617. Client detail 615 and offender detail 616 provide further access to demographics functions 620 which contains access to contacts 621 and medical history 622.

Script manager privileges provide access to script manager home 618 and to script management functions 619.

Fulfillment privileges provides access to fulfillment home 623 and device management functions 624 and device assignment functions 625.

A preferred embodiment of a call monitoring center in accordance with the concepts described herein includes a monitoring center which is staffed 24 hours, seven days a week. The monitoring center is responsible for monitoring all of the remote tracking devices in the field and is staffed based on historical patterns of requirements for intervention by monitoring center staff. The computers of the monitoring center automatically receive and process the location and status information continuously or periodically sent by each of the remote tracking devices. Based on programmable rules in the monitoring center software, the occurrence of certain conditions in the remote tracking devices results in the monitoring center software sending an alert to one of the monitoring center personnel. These conditions are usually related to alarm conditions in a remote tracking device, but can be programmed to be any condition which might be of interest to the monitoring center personnel or the supervisors or administrators of the person being monitored.

When a condition is determined to require the attention of monitoring center personnel, the monitoring center software determines the appropriate monitoring center agent and sends the alert to the agent's terminal. The agent can then respond to the alert or access data in the monitoring center computers related to the history of the remote tracking device, the current parameters programmed into the remote tracking device, information on the wearer of the device or the agency or administrator in charge of the wearer and the device. If intervention, such as the initiation of a two-way voice call, is required by the agent, the monitoring center software provides a predetermined script for the agent to follow to ensure that the intervention by the agent conforms to the policies of the monitoring center and the agency or supervisor responsible for the tracking device and wearer.

In addition to the monitoring center software generating an alert which requires the attention of a monitoring center agent, agents may be required to respond to incoming calls from various interested persons including the wearer of the remote tracking device or the supervisor or administrator of a wearer or device. Referring now to FIG. 7, an embodiment of a call routing system 700 for use in the call monitoring center is described. Routing system 700 is operable to receive incoming calls from a variety of sources 701, 702, 703 and 704, which could be the wearer of a remote tracking device 702, a supervisor or administrator 703, or other incoming call 701 or 704. A routing function 705 in the monitoring center call system determines the appropriate agent to receive the call from currently active agents at the center. The call may be routed based on the source of the call or may be routed based on a queue of available agents or any other routing criteria which may be used to select an appropriate agent.

Once the agent has been selected the application passes the call details to the agent's terminal as shown by process 706. In process 707, the application uses the dialed number to select an application context, and then in process 708 determines a call handling flow for each specific type of call. Call routing system 700 also includes a contingent process flow 709 for situations in which no call detail information is available to determine context and call flow for the agent. In the contingent process 709, the agent manually enters the caller's phone number into the agent application which then looks up the customer records and uses those records to determine the appropriate context and flow for the call.

As has been described, embodiments of the remote tracking device maintain status on themselves in the form of states for various aspects of the devices. This status is sent to the monitoring center and maintained by the monitoring center application. Monitoring center personnel, or supervisors or administrators can access the status of the any particular device under their control. An example of the types of status which can be maintained by the RTD and monitoring center is shown in FIG. 8. FIG. 8 is an illustration of a screen shot of an embodiment of the monitoring center application in accordance with the concepts described herein. While FIG. 8 shows particular aspects of the RTD on which status is maintained other aspects of the RTD, it's operating environment, or operating conditions can also be maintained within the scope of the concepts described herein.

Figure 9A:
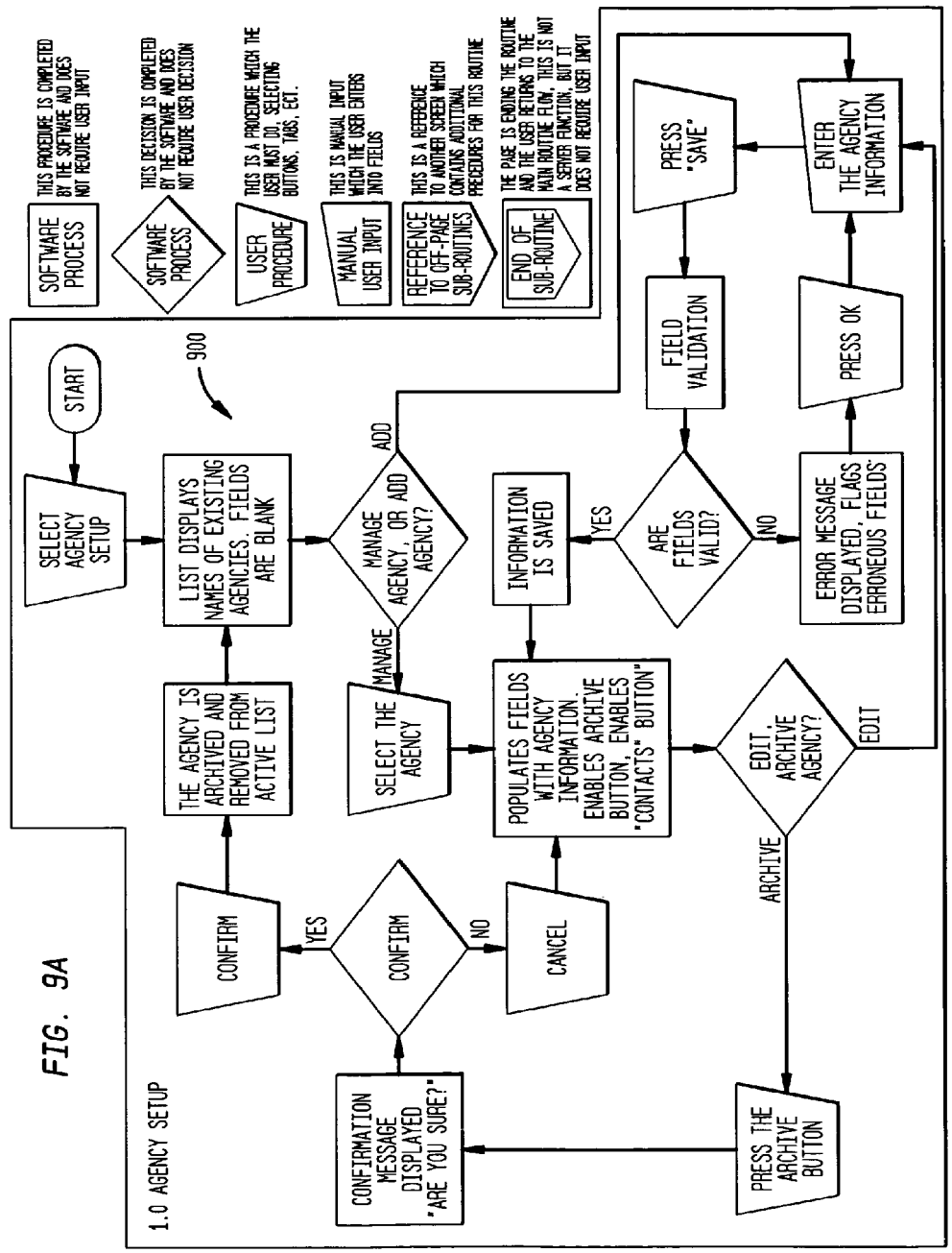

Referring now to FIGS. 9A through 9J, embodiments of flow charts illustrating the operation and functionality of an embodiment of aspects of the monitoring center software and/or applications are shown. FIG. 9A illustrates an embodiment of an agency setup flow. Agency setup flow 900 illustrates a process by which an administrator or operator can create an agency for which one or more officers will be assigned RTDs that will be monitored by the monitoring center. FIG. 9B illustrates an embodiment of an officer/administrator setup flow. Officer setup flow 90 I illustrates the process by which officers/administrators of a particular agency can be setup with control over particular RTDs and provided access to the monitoring center application.

Figure 9C:
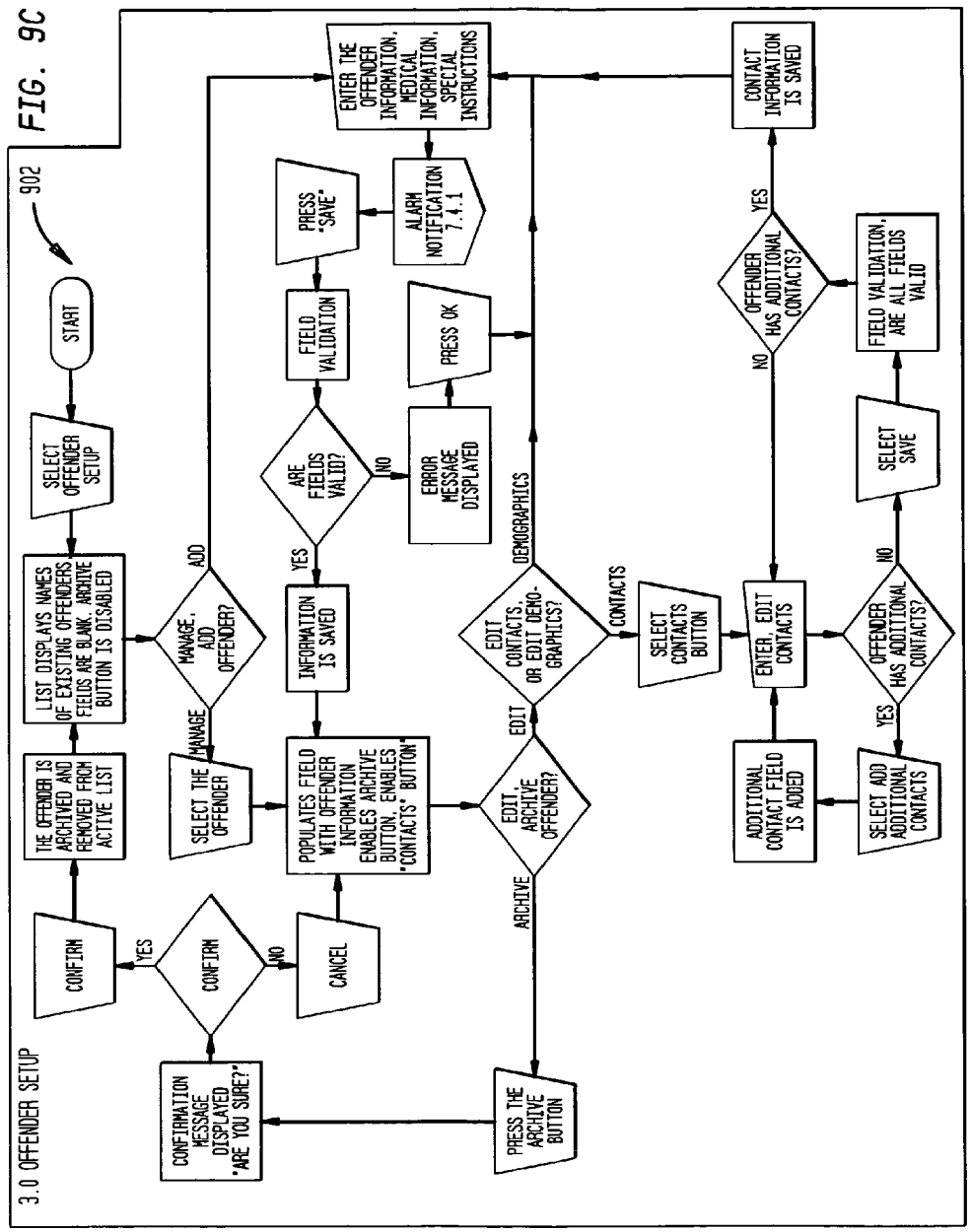
Figure 9D:
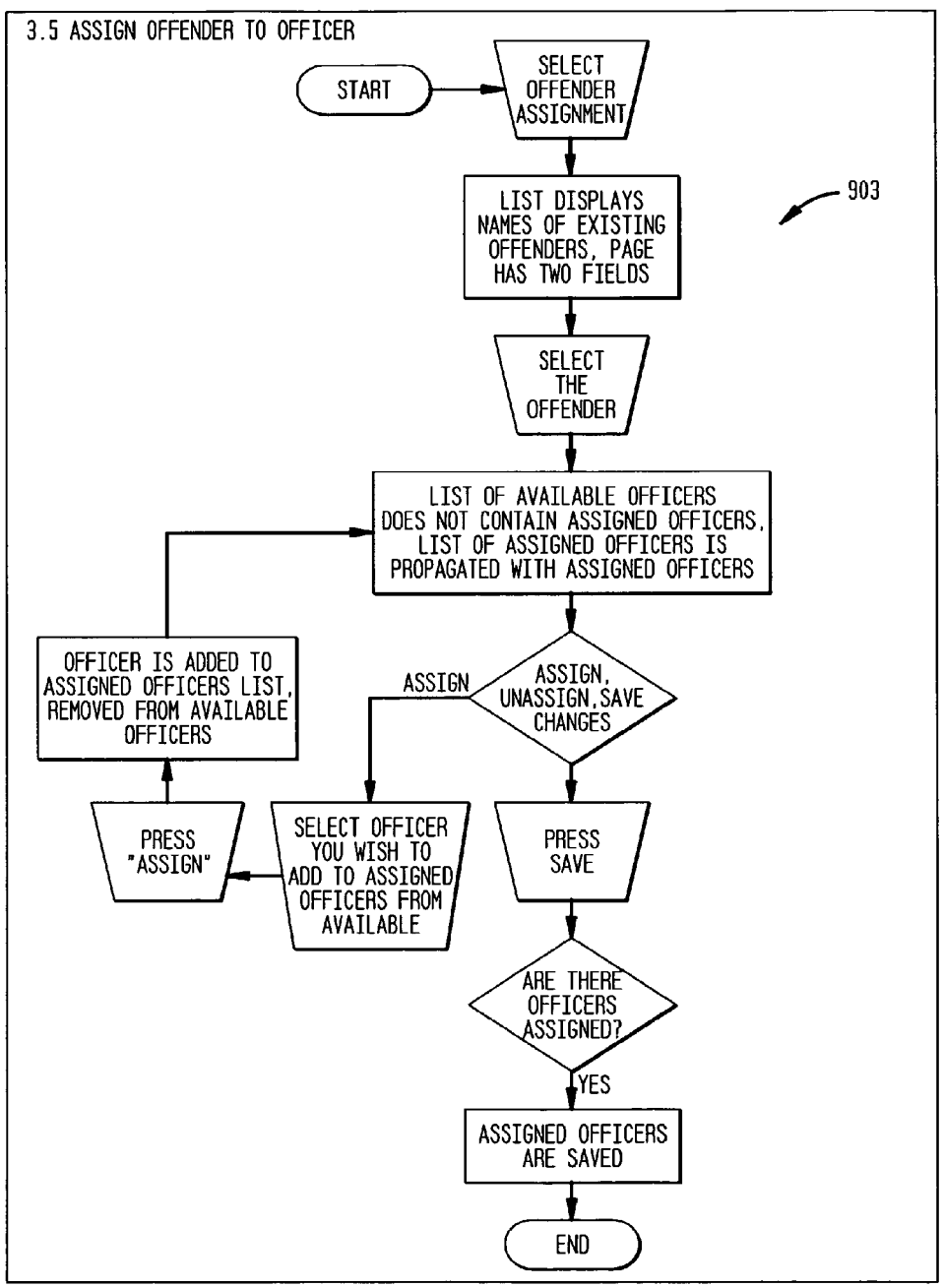

FIG. 9C illustrates an embodiment of an offender/wearer setup flow. Offender/wearer setup flow 902 illustrates the process by which supervisors or agents of the monitoring center or officers/administrators of a particular agency can setup particular RTDs and provided relevant and required information to the monitoring center application concerning each offender wearer of an RTD. FIG. 9D illustrates an embodiment of an offender/wearer assignment flow. Assignment flow 903 illustrates the process by which officers/administrators of a particular agency are assigned with authority over particular RTDs and offenders/wearers.

Figure 9E:
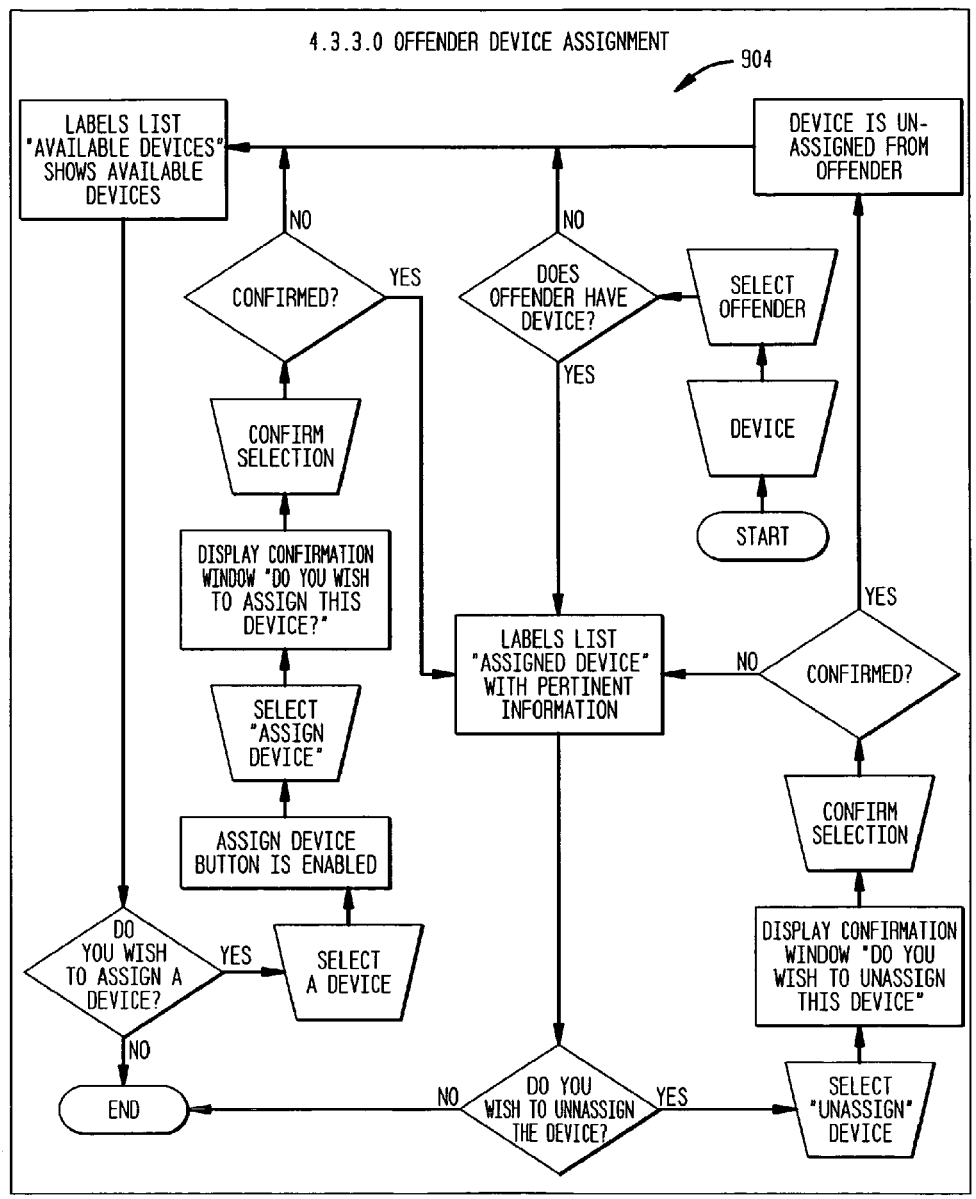
Figure 9F:
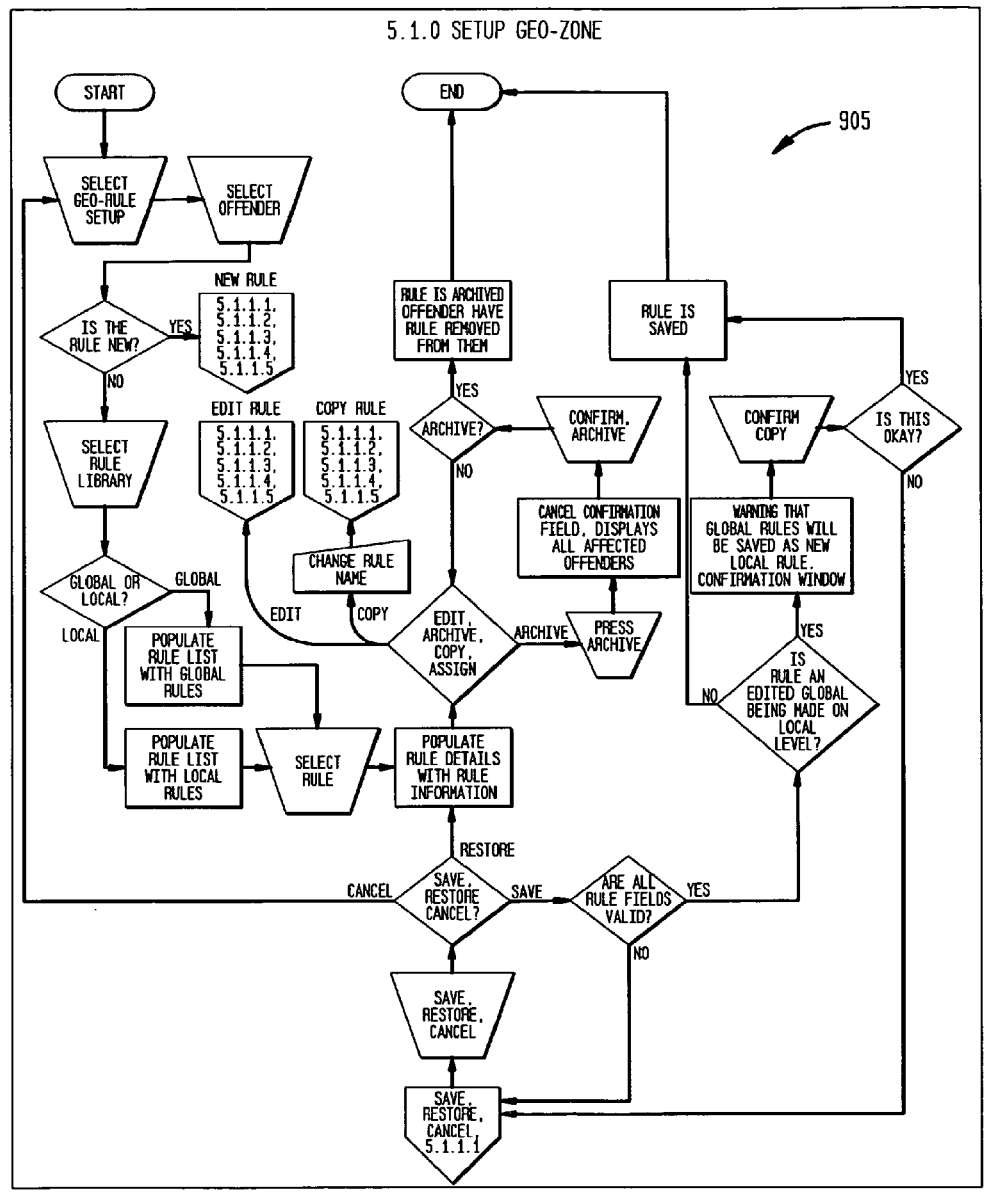
Figure 9G:
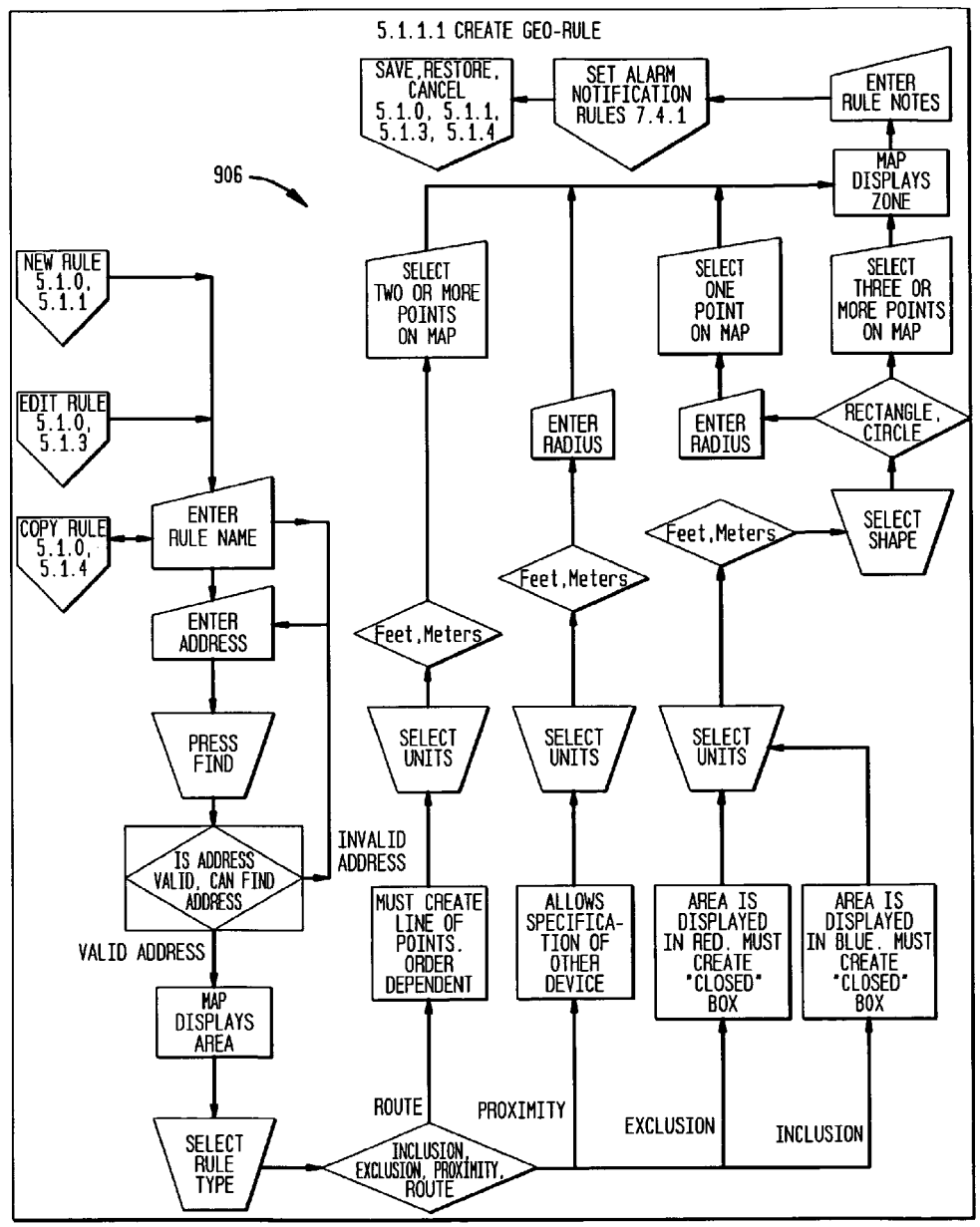
Figure 9H:
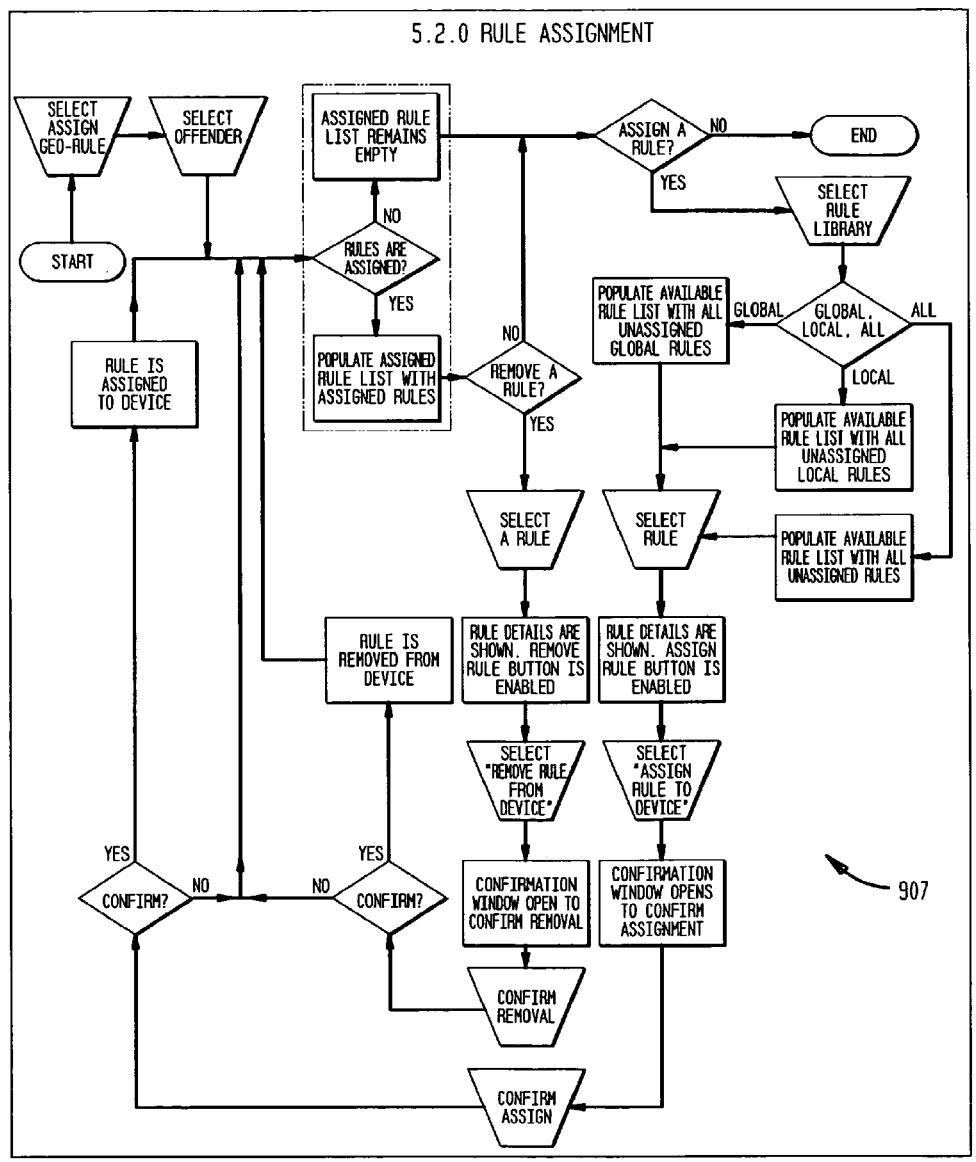

FIG. 9E illustrates an embodiment of an offender/wearer device assignment flow. Device assignment flow 904 illustrates the process by which individual offenders/wearers are assigned with particular RTDs. FIGS. 9F, 9G and 9H illustrate an embodiment of an inclusion/exclusion zone, referred to collectively as geo-zones, setup flow. Geo-zone setup flows 905, 906 and 907 illustrate the process by which operators or officers/administrators can setup inclusion and exclusion zone rules for a particular RTDs and offender/wearer.

Figure 9I:
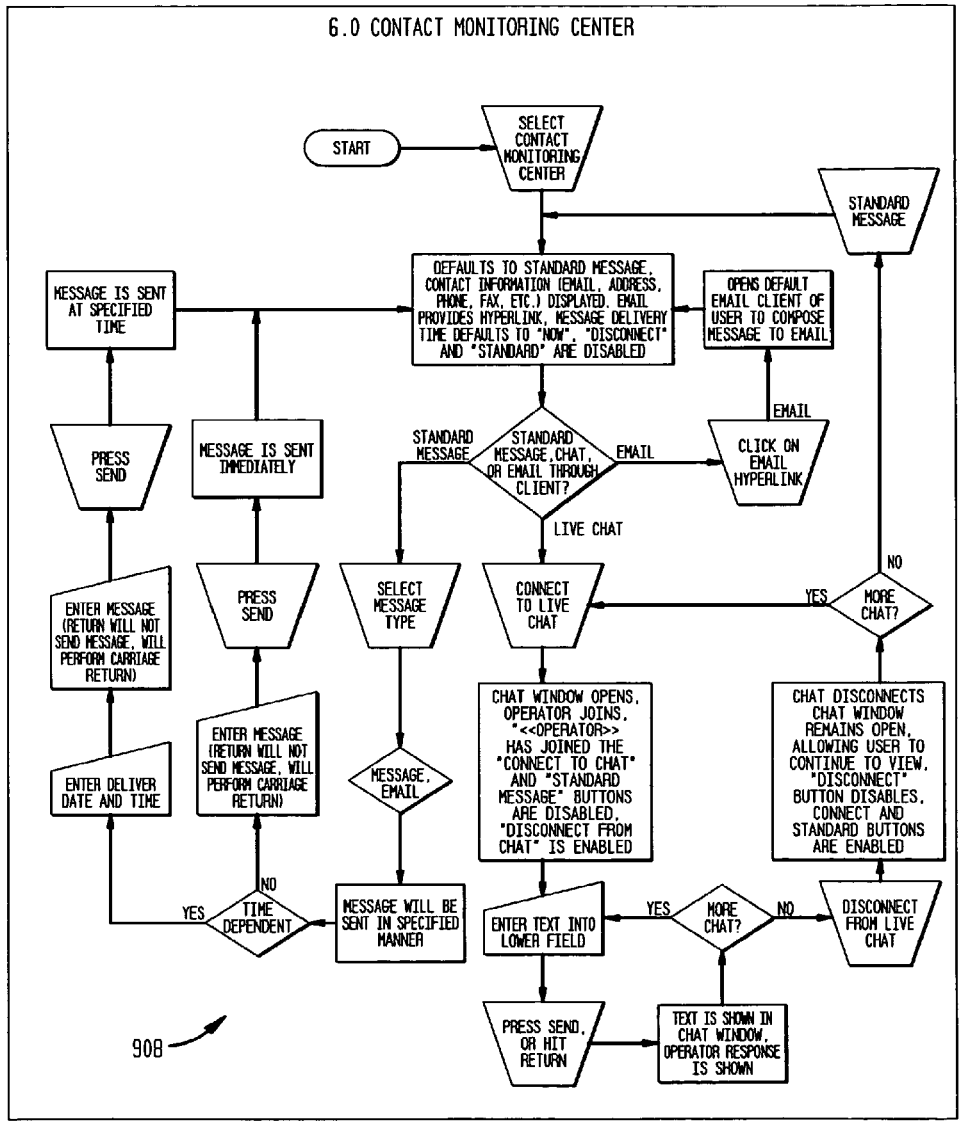
Figure 9J:
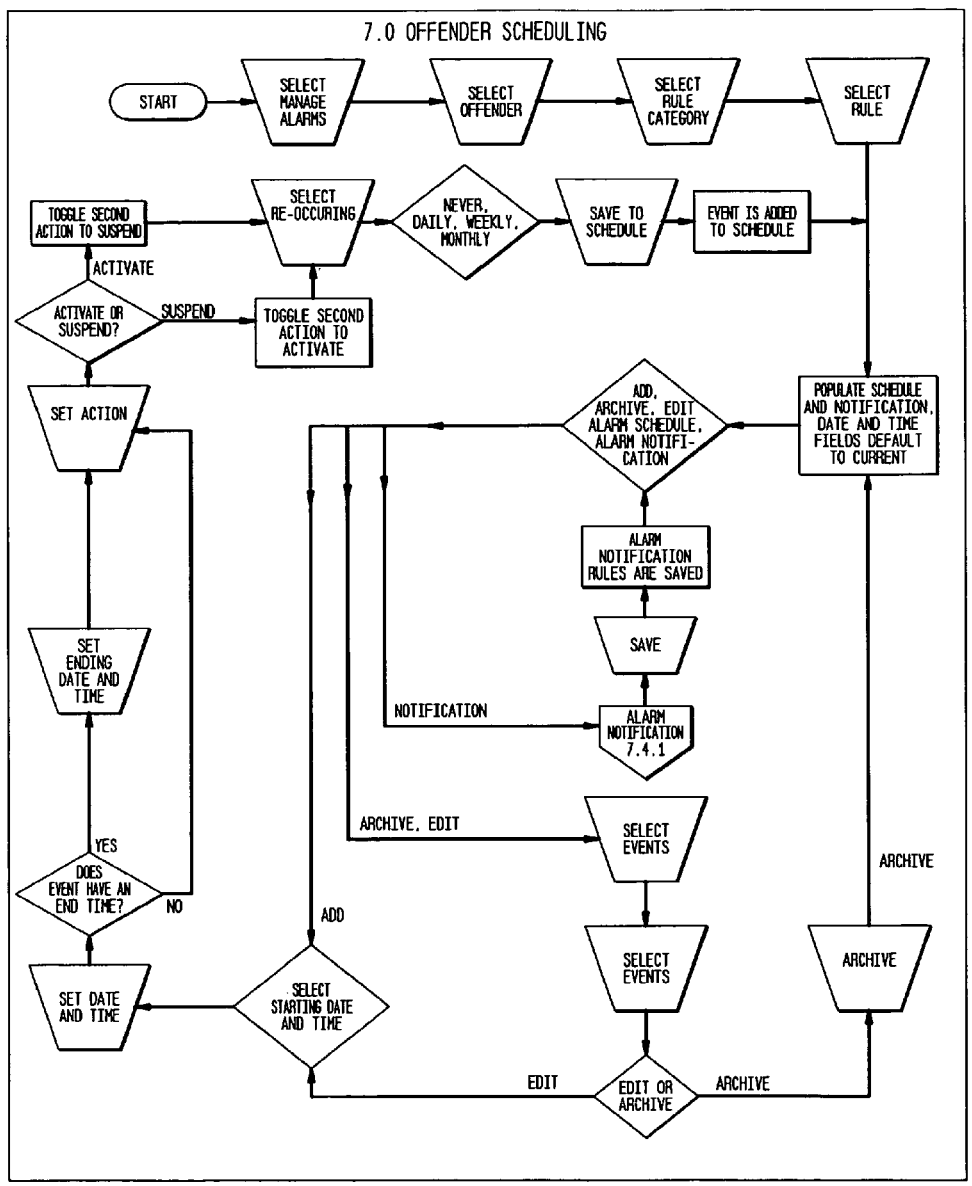

FIG. 9I illustrates an embodiment of an contact monitoring center flow. Assignment flow 903 illustrates the process by which the monitoring center can be contacted by standard message, live chat or email. FIG. 9J illustrates an embodiment of an offender/wearer scheduling flow. Scheduling flow 909 illustrates the process by which operators or officers/administrators of a particular agency can manage alarm schedules for particular RTDs and offenders/wearers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A remote tracking device in a remote tracking system having a monitoring center, the remote tracking device comprising:
   a housing connected to a tamper-resistant strap;
   a positioning system receiver in the housing and operable to receive signals indicative of the geographical location of the remote tracking device;
   a cellular transceiver in the housing and operable to communicate with the monitoring center; and
   a processor in the housing and in electrical communication with the positioning system receiver and the cellular transceiver, the processor operable to compare the location of the remote tracking device with a set of one or more pre-programmed rules,
   wherein the pre-programmed rules define permissible geographical locations for the remote tracking device, and
   wherein the processor is programmed to initiate, without human intervention, the establishment of a two-way voice communication channel between the remote tracking device and a monitoring center when the processor's comparison of the geographical location of the remote tracking device with the set of pre-programmed rules results in a determination that the remote tracking device is not in a permissible geographical location.

2. The remote tracking device of claim 1, wherein the remote tracking device is enabled to use the cellular transceiver to place a call to the monitoring center by dialing a telephone number associated with the monitoring center.

3. The remote tracking device of claim 1, wherein the remote tracking device is also enabled to send data to the monitoring center when the processor's comparison of the geographical location of the remote tracking device with the set of pre-programmed rules results in a determination that the remote tracking device is not in a permissible geographical location.

4. The remote tracking device of claim 1, wherein the remote tracking device is also enabled to provide audio feedback to the wearer when the processor's comparison of the geographical location of the remote tracking device with the set of pre-programmed rules results in a determination that the remote tracking device is not in a permissible geographical location.

5. The remote tracking device of claim 1, wherein the processor is programmed to initiate, without human intervention, the establishment of the two-way voice communication channel by sending data to the monitoring center, in response to which the monitoring center places a call to the remote tracking device.

6. The remote tracking device of claim 1, wherein the remote tracking device also includes a call button for placing a call to the monitoring center.

7. A method for monitoring a remote tracking device in a remote monitoring system having a monitoring center, the method comprising:
   generating, at the remote tracking device, location information about the geographical location of the remote tracking device;
   comparing, at the remote tracking device, the location information to a set of one or more pre-programmed rules stored at the remote tracking device;
   wherein the pre-programmed rules define permissible locations for the remote tracking device, and
   executing programmed instructions, on a processor at the remote tracking device, that establish, without human intervention, a two-way voice communication channel between the remote tracking device and the monitoring center when the comparison of the location of the remote tracking device with the set of pre-programmed rules results in a determination that the remote tracking device is not in a permissible location.

8. The method recited in claim 7, wherein the remote tracking device also includes a call button for placing a call to the monitoring center, and wherein two-way communication can also be initiated manually by the wearer by pressing call button on the remote tracking device.

9. The method recited in claim 7, wherein automatic initiation of the two-way communication using the cellular transceiver occurs without requiring the call button to be manually pressed.

10. The method of claim 7, wherein the remote tracking device is enabled to receive a call initiated from the monitoring center.

11. The method of claim 7, wherein the method further comprises the remote tracking device sending data to the monitoring center when the processor's comparison of the geographical location of the remote tracking device with the set of pre-programmed rules results in a determination that the remote tracking device is not in a permissible geographical location.

12. A remote tracking device in a remote tracking system having a monitoring center, the remote tracking device comprising:
   a housing connected to a tamper-resistant strap;
   a positioning system receiver in the housing and operable to receive signals indicative of the geographical location of the remote tracking device;
   a cellular transceiver in the housing and operable to communicate with the monitoring center; and
   a processor in the housing and in electrical communication with the positioning system receiver and the cellular transceiver, the processor operable to compare the location of the remote tracking device with a set of one or more pre-programmed rules,
   wherein the pre-programmed rules define permissible geographical locations for the remote tracking device, and
   wherein the processor is programmed to initiate, without human intervention, the establishment of a two-way voice communication channel between the remote tracking device and a monitoring center when the processor's comparison of the geographical location of the remote tracking device with the set of pre-programmed rules results in a determination that the remote tracking device is not in a permissible geographical location, and
   wherein the remote tracking device is also enabled to receive a call initiated from the monitoring center.

13. The remote tracking device of claim 12, wherein the remote tracking device is also enabled to initiate the establishment of a two-way voice communication channel between the remote tracking device and the monitoring center when the wearer presses a button on the remote tracking device.

14. The remote tracking device of claim 12, wherein the remote tracking device is enabled to use the cellular transceiver to place a call to the monitoring center by dialing a telephone number associated with the monitoring center.

15. The remote tracking device of claim 12, wherein the remote tracking device is also enabled to send data to the monitoring center when the processor's comparison of the geographical location of the remote tracking device with the set of pre-programmed rules results in a determination that the remote tracking device is not in a permissible geographical location.

16. The remote tracking device of claim 12, wherein the processor is programmed to initiate, without human intervention, the establishment of the two-way voice communication channel by sending data to the monitoring center, in response to which the monitoring center places a call to the remote tracking device.

17. The electronic tracking system of claim 12, wherein the monitoring center uses the voice communication to provide instructions to the wearer based on the status and/or location information.

18. The electronic tracking system of claim 12, wherein the remote tracking device is also enabled to automatically initiate the voice communication in response to detecting a particular status of the remote tracking device, the particular status of the remote tracking device comprising an alarm condition.

19. The electronic tracking system of claim 18, wherein the remote tracking device sends an indication of the alarm condition to the monitoring center upon the initial indication of the alarm condition.

20. The electronic tracking system of claim 12, wherein a subsequent two-way communication is initiated by a third party administrator.

21. The electronic tracking system of claim 20, wherein the third party administrator, through a web application, instructs the monitoring center to establish the subsequent two-way communication.

22. The electronic tracking system of claim 21, wherein the monitoring center conferences the third party administrator into the subsequent two-way communication with the remote tracking device.

23. The electronic tracking system of claim 22, wherein the subsequent two-way communication comprises a three way communication between the administrator, the monitoring center and the remote tracking device and wherein the administrator is remotely located from the monitoring center.

24. The electronic tracking system of claim 12, wherein the remote tracking device is enabled to identify and block communication calls that do not originate from the monitoring center.

25. The electronic tracking system of claim 12, wherein the telephone number is a first telephone number and wherein the automatic initiation of the two-way communication includes the remote tracking device dialing a secondary telephone number associated with the monitoring center in response to obtaining an unsuccessful result after dialing the first telephone number associated with the monitoring center.

26. The electronic tracking system of claim 12, wherein the automatic initiation of the two-way voice communication is part of an escalating alarm condition in which the remote tracking device sends notice to the monitoring center of the particular status of the remote tracking device prior to initiating the two-way voice communication with the monitoring center.

\* \* \* \* \*